United States Patent [19]
Shimizu

[11] Patent Number: 5,359,853
[45] Date of Patent: Nov. 1, 1994

[54] DEVICE FOR DETECTING DETERIORATION OF A CATALYTIC CONVERTER FOR AN ENGINE

[75] Inventor: Yasuhiro Shimizu, Nishikamo, Japan

[73] Assignee: Toyota Jidosha Kabushiki Kaisha, Toyota, Japan

[21] Appl. No.: 152,236

[22] Filed: Nov. 16, 1993

[30] Foreign Application Priority Data

Dec. 9, 1992 [JP] Japan ................... 4-329405

[51] Int. Cl.⁵ ........................................ F02D 41/14
[52] U.S. Cl. .................................... 60/276; 60/277; 60/285; 123/703
[58] Field of Search ............... 60/272, 274, 276, 277, 60/285; 123/672, 703

[56] References Cited

U.S. PATENT DOCUMENTS

| 4,819,427 | 4/1989 | Nagai et al. | 60/285 |
| 4,964,271 | 10/1990 | Sawada et al. | 60/285 |
| 5,077,970 | 1/1992 | Hamburg | 60/285 |
| 5,158,059 | 10/1992 | Kuroda . | |
| 5,165,230 | 11/1992 | Kayanuma et al. . | |

FOREIGN PATENT DOCUMENTS 2675539 10/1992 France .
4112479A1 10/1992 Germany .
4-109051 10/1992 Japan .

Primary Examiner—Richard R. Cole
Assistant Examiner—Daniel J. O'Connor
Attorney, Agent, or Firm—Oliff & Berridge

[57] ABSTRACT

The device according to the invention detects deterioration of a catalytic converter disposed in an exhaust passage of an internal combustion engine based on output signal response curves of the air-fuel ratio sensors disposed in the exhaust passage upstream and downstream of the catalytic converter, by determining that the catalytic converter has deteriorated when relationship of a ratio of the lengths of the output response curves of the upstream and downstream air-fuel ratio sensors and a ratio of the areas bounded by the output signal response curves and reference lines satisfies predetermined conditions during air-fuel ratio feedback control of the engine; to eliminate errors the detection during a transition of the operating condition of the engine, the device also determine a degree of transition of the operating condition of the engine, for example, by detecting number of reversals of the output signal of the upstream air-fuel ratio sensor, and corrects the value of the ratio of the areas of the output signal response curves in accordance with the degree of the transition of the operating condition of the engine; thus the deterioration of the catalytic converter is detected accurately both in the transition operating condition and in the stable operating condition.

30 Claims, 27 Drawing Sheets

Fig.2

| No | LEVEL OF CATALYST DETERIORATION | DOWNSTREAM O₂ SENSOR | OPERATING CONDITION | OUTPUT RESPONSE OF UPSTREAM O₂ SENSOR | OUTPUT RESPONSE OF DOWNSTREAM O₂ SENSOR | RATIO OF LENGTHS $\frac{LVOS}{LVOM}$ | RATIO OF AREAS $\frac{AVOS}{AVOM}$ |
|----|----|----|----|----|----|----|----|
| 1 | HIGH | NORMAL | TRANSIENT | | | 1.0 | 1.0 |
| 2 | HIGH | DETERIORATED | TRANSIENT | | | 0.7 | 0.7 |
| 3 | HIGH | NORMAL | STABLE | | | 1.0 | 1.0 |
| 4 | HIGH | DETERIORATED | STABLE | | | 0.7 | 0.7 |
| 5 | MEDIUM | NORMAL | TRANSIENT | | | 0.7 | 1.0 |
| 6 | MEDIUM | DETERIORATED | TRANSIENT | | | 0.5 | 0.7 |
| 7 | MEDIUM | NORMAL | STABLE | | | 0.7 | 0.7 |
| 8 | MEDIUM | DETERIORATED | STABLE | | | 0.5 | 0.5 |

Fig.6A
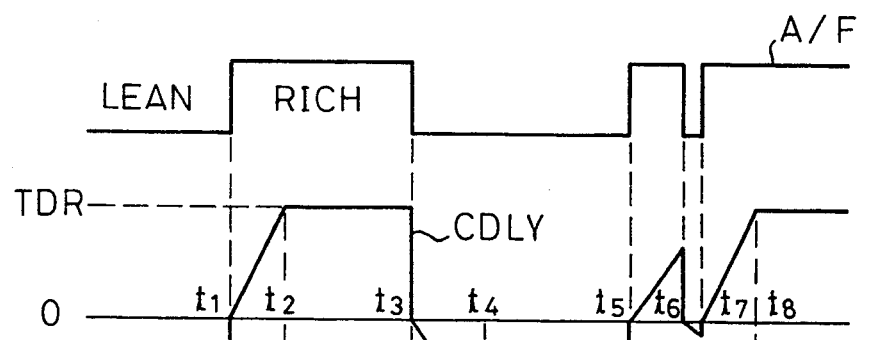
Fig.6B
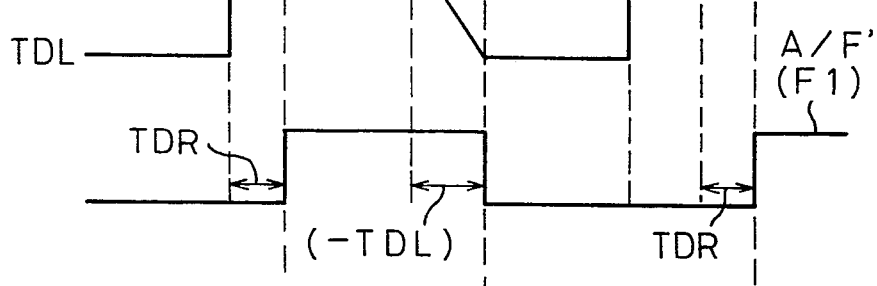
Fig.6C
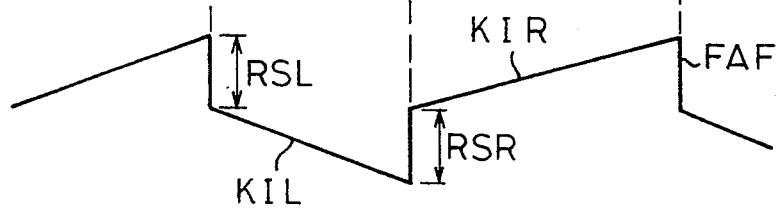
Fig.6D

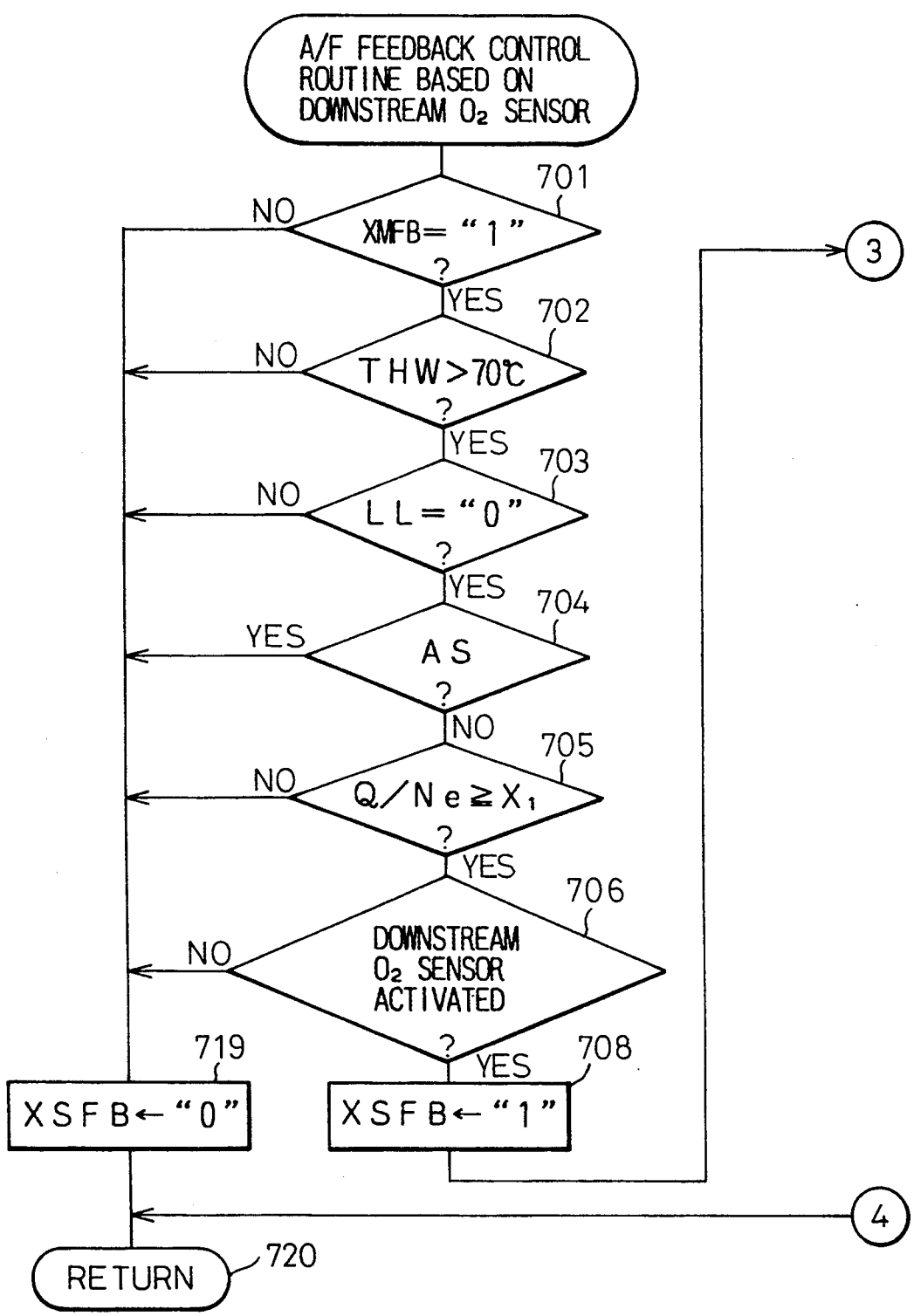

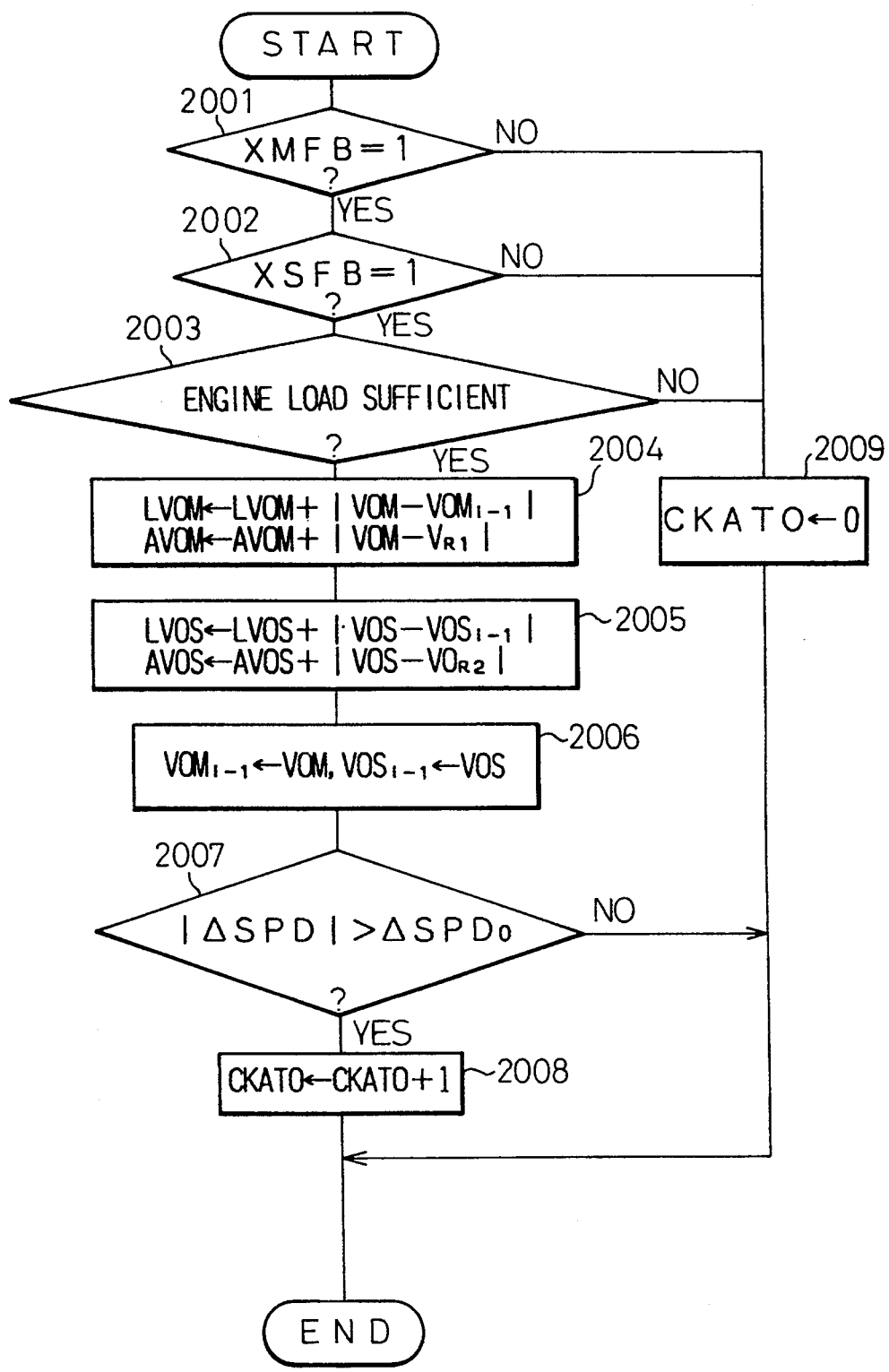

Fig.22

(WITH NORMAL CATALYST) ○···NORMAL O₂ SENSOR   ×···DETERIORATED O₂ SENSOR

| | OUTPUT RESPONSE OF THE UPSTREAM O₂ SENSOR (VOM) | OUTPUT RESPONSE OF THE DOWNSTREAM O₂ SENSOR (VOS) | $\frac{LVOS}{LVOM}$ | $\frac{AVOS}{AVOM}$ |
|---|---|---|---|---|
| (1) | ○ 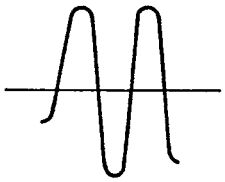 LVOM : LARGE  AVOM : LARGE | ○ 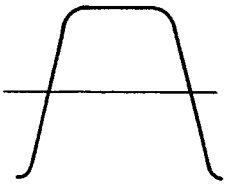 LVOS : SMALL  AVOS : LARGE | SMALL | LARGE |
| (2) | ○ LVOM : LARGE  AVOM : LARGE | × LVOS : SMALL  AVOS : MEDIUM | VERY SMALL | MEDIUM OR SMALL |
| (3) | × 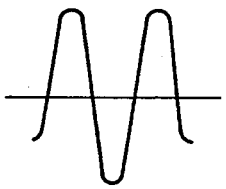 LVOM : SMALL  AVOM : SMALL | ○ 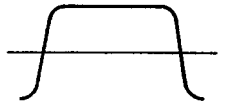 LVOS : SMALL  AVOS : LARGE | MEDIUM | VERY SMALL |
| (4) | × 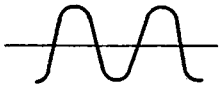 LVOM : SMALL  AVOM : SMALL | ×  LVOS : SMALL  AVOS : MEDIUM | SMALL | LARGE |

Fig.23

(WITH DETERIORATED CATALYST)    ○···NORMAL O₂ SENSOR    ×···DETERIORATED O₂ SENSOR

| | OUTPUT RESPONSE OF THE UPSTREAM O₂ SENSOR (VOM) | OUTPUT RESPONSE OF THE DOWNSTREAM O₂ SENSOR (VOS) | LVOS / LVOM | AVOS / AVOM |
|---|---|---|---|---|
| (5) | ○<br>LVOM: LARGE<br>AVOM: LARGE | ○<br>LVOS: LARGE<br>AVOS: LARGE | LARGE | MEDIUM OR LARGE |
| (6) | ○<br>LVOM: LARGE<br>AVOM: LARGE | ×<br>LVOS: MEDIUM<br>AVOS: SMALL | MEDIUM | SMALL |
| (7) | ×<br>LVOM: SMALL<br>AVOM: SMALL | ○<br>LVOS: LARGE<br>AVOS: LARGE | LARGE | LARGE |
| (8) | ×<br>LVOM: SMALL<br>AVOM: SMALL | ×<br>LVOS: MEDIUM<br>AVOS: SMALL | LARGE | MEDIUM OR LARGE |

# DEVICE FOR DETECTING DETERIORATION OF A CATALYTIC CONVERTER FOR AN ENGINE

BACKGROUND OF THE INVENTION

1. Field of the Invention

The present invention relates to an air-fuel ratio control device for an engine that controls an air-fuel ratio of the engine based on at least an output of an air-fuel ratio sensor disposed in the exhaust passage upstream of a three-way catalyst. More specifically, the present invention relates to an air-fuel control device that is able to detect deterioration of the three-way catalyst based on output signals of air-fuel ratio sensors disposed in the exhaust passage upstream and downstream of the three-way catalyst even during a transition of the operating condition of the engine.

2. Description of the Related Art

An air-fuel ratio control device for controlling the air-fuel ratio of an engine by feedback control based on an output of one air-fuel ratio sensor (such as an $O_2$ sensor) disposed in an exhaust passage upstream of a catalytic converter is known as a single $O_2$ sensor system. The single $O_2$ sensor system is used to control the air-fuel ratio of the engine at a stoichiometric air-fuel ratio to thereby improve the condition of exhaust emissions by utilizing the ability of the three-way catalytic converter to a maximum degree.

Also, to compensate for the individual difference among cylinders or changes due to aging of the upstream $O_2$ sensor, a double $O_2$ sensor system using two $O_2$ sensors has been developed(U.S. Pat. No. 4,739,614). In the double $O_2$ sensor system, $O_2$ sensors are disposed upstream and downstream of the catalytic converter in the exhaust passage, and the air-fuel ratio control is carried out based on the output of the downstream $O_2$ sensor as well as the output of the upstream $O_2$ sensor.

Nevertheless, even in the double $O_2$ sensor system, if the catalyst in the catalyst converter deteriorates, the condition of the exhaust emissions such as HC, CO, $NO_x$ deteriorates. Therefore, it is necessary to detect the deterioration of the catalyst accurately.

To detect the deterioration of the catalyst in the catalytic converter, various methods and devices have been proposed.

For example, the deterioration of the catalyst can be determined by detecting a reduction in the $O_2$ storage capacity of the catalyst. That is, the catalyst has an ability to adsorb oxygen from the exhaust gas when the air-fuel ratio is lean compared to the stoichiometric air-fuel ratio (i.e., the air-fuel ratio of the exhaust gas is higher than the stoichiometric air-fuel ratio), and to release said oxygen when the air-fuel ratio is rich compared to the stoichiometric air-fuel ratio (i.e., the air-fuel ratio of the exhaust gas is lower than the stoichiometric air-fuel ratio). This capacity, i.e., the $O_2$ storage capacity of the catalyst, falls as the deterioration of the catalyst proceeds. Therefore, when the catalyst is in a normal condition, the fluctuation of the air-fuel ratio of the exhaust gas downstream of the catalytic converter is small, and consequently, the fluctuation of the output of the downstream $O_2$ sensor also becomes small even if the air-fuel ratio of the exhaust gas oscillates between a rich air-fuel ratio and a lean air-fuel ratio. On the contrary, if the catalyst has deteriorated, the air-fuel ratio of the exhaust gas downstream of the catalytic converter oscillates in a manner similar to the oscillation of the air-fuel ratio of the exhaust gas upstream of the catalytic converter due to the deterioration of the $O_2$ storage capacity of the catalyst, and the output of the downstream $O_2$ sensor also fluctuates as the output of the upstream $O_2$ sensor fluctuates. Therefore, when the catalyst has deteriorated, the interval between reversals of the output signal of the downstream $O_2$ sensor (i.e., the period between changes of the output signal of the downstream $O_2$ sensor from a rich air-fuel ratio signal to a lean air-fuel ratio signal, or vice versa) during air-fuel ratio feedback control becomes shorter (in other words, the number of the reversals of the output signal of the downstream $O_2$ sensor within a predetermined time becomes larger), and the amplitude of the fluctuations in the output signal of the downstream $O_2$ sensor becomes larger at the same time.

In the system disclosed in U.S. Pat. No. 4,739,614, it is determined that the catalyst has deteriorated when the ratio of the intervals between the reversals of the upstream $O_2$ sensor $T_1$ to the intervals between the reversals of the downstream $O_2$ sensor $T_2$, i.e., $T_1/T_2$ becomes larger than a predetermined value (or, alternatively, when the interval $T_2$ of the downstream $O_2$ sensor becomes smaller than a predetermined value).

However, in the above system, if the center value of the air-fuel ratio feedback control deviates from the stoichiometric air-fuel ratio, the reversal of the output of the downstream $O_2$ sensor does not cross the stoichiometric line, and oscillates in a small amplitude on a rich side or a lean side of the air-fuel ratio. In this case, deterioration of the catalyst cannot be detected by the intervals or the number of the reversals of the output of the downstream $O_2$ sensor. Also, it is not possible to detect deterioration from the amplitude of the oscillation of the output of the downstream $O_2$ sensor since the amplitude of the output of the downstream $O_2$ sensor becomes very small regardless of the deterioration of the catalyst in this case.

Further, if the downstream $O_2$ sensor itself has deteriorated, the amplitude of the output of the downstream $O_2$ sensor becomes smaller regardless of the deterioration of the catalyst. Therefore, it is sometimes very difficult to detect deterioration of the catalyst accurately based on the intervals or the number of the reversals as well as the amplitude of the output of the downstream $O_2$ sensor.

To solve above-mentioned problems, the copending U.S. patent application Ser. No. 957,041 proposes a method for detecting deterioration of the catalyst based on a ratio of the lengths of the output signal response curves of the upstream and downstream $O_2$ sensors and a ratio of the areas bounded by the output signal response curves and reference lines.

When the catalyst is in normal condition, the air-fuel ratio of the exhaust gas downstream of the catalytic converter fluctuates in a small amplitude about the stoichiometric air-fuel ratio due to the $O_2$ storage capacity of the catalyst even when the air-fuel ratio of the exhaust gas upstream of the catalytic converter oscillates between a rich side air-fuel ratio and a lean side air-fuel ratio. In this case, the fluctuation of the output of the downstream $O_2$ sensor is smaller compared to the fluctuation of the output of the upstream $O_2$ sensor. Therefore, the length LVOS of the output signal response curve of the downstream $O_2$ sensor becomes smaller compared to the length LVOM of the output signal response curve of the upstream $O_2$ sensor. Consequently, the ratio of the lengths LVOS/LVOM also becomes small when the catalyst is in normal condition.

On the contrary, when the catalyst has deteriorated, the air-fuel ratio of the exhaust gas downstream of the catalyst converter oscillates in a similar manner as the oscillation of the air-fuel ratio upstream of the catalytic converter due to reduction of the $O_2$ storage capacity of the catalyst. In this case, the length LVOS of the output signal response curve of the downstream $O_2$ sensor increases since the amplitude and the frequency of the fluctuation of the output signal of the downstream $O_2$ sensor increase, though the length LVOM of the output response curve of the upstream $O_2$ sensor stays same. Therefore, the value of the ratio of the lengths LVOS/LVOM increases, and approaches to 1.0 as the deterioration of the catalyst proceeds. Thus, deterioration of the catalyst can be detected by monitoring the value LVOS/LVOM as far as the $O_2$ sensors are not deteriorated.

However, if either of the $O_2$ sensors has deteriorated, deterioration of the catalyst cannot be detected accurately by the value of the ratio LVOS/LVOM any more.

When deteriorated, the amplitude of the output of the $O_2$ sensor becomes smaller. This causes a decrease in the length of the output signal response curve of the deteriorated $O_2$ sensor. Therefore, for example, if the downstream $O_2$ sensor has deteriorated, the length LVOS does not increase largely even if the catalyst has deteriorated. In this case, a deteriorated catalyst may be incorrectly determined as being normal since the increase in the ratio LVOS/LVOM is relatively small.

On the other hand, if the upstream $O_2$ sensor has deteriorated, the length LVOM becomes smaller regardless of the deterioration of the catalyst. In this case, a normal catalyst may be incorrectly determined as being deteriorated since the ratio LVOS/LVOM increases.

To prevent such an incorrect determination, the method proposed by the copending U.S. application Ser. No. 957,041 uses the ratio of the area AVOS bounded by the output signal response curve of the downstream $O_2$ sensor and a reference line, and the area AVOM bounded by the output signal response curve of the upstream $O_2$ sensor for detecting deterioration of the catalyst in addition to the ratio of the lengths LVOS/LVOM.

FIGS. 22 and 23 show the changes in the values of the ratio of the lengths LVOS/LVOM and the ratio of the areas AVOS/AVOM in accordance with the deterioration of the upstream $O_2$ sensor and downstream $O_2$ sensor when the catalyst is normal (FIG. 22), and when the catalyst has deteriorated (FIG. 23). In FIGS. 22 and 23, the columns with a ○ mark indicate waveforms of the output signal response curves of $O_2$ sensors in normal condition, and the columns with a x mark indicate waveforms of the output signal response curves of deteriorated $O_2$ sensors.

As seen from FIGS. 22 and 23;

(1) The output of the upstream $O_2$ sensor is only affected by the deterioration of the upstream $O_2$ sensor itself. Namely, if the upstream $O_2$ sensor is not deteriorated, both the length LVOM and the area AVOM are large regardless of the deterioration of the catalyst (FIG. 22, (1), (2) and FIG. 23, (5), (6))). If the upstream $O_2$ sensor has deteriorated, both the length LVOM and AVOM become small regardless of the deterioration of the catalyst (FIG. 22, (3), (4) and FIG. 23, (7), (8)).

(2) The output of the downstream $O_2$ sensor is affected by both the deterioration of the downstream $O_2$ sensor itself and the deterioration of the catalyst.

Namely, If the catalyst is not deteriorated;
① The length LVOS is small regardless of the deterioration of the downstream $O_2$ sensor (FIG. 22, (1) through (4));
② The area AVOS is large when the downstream $O_2$ sensor is not deteriorated (FIG. 22, (1) and (3)), and is medium when the downstream $O_2$ sensor has deteriorated (FIG. 22, (2) and (4)).

And, if the catalyst has deteriorated;
① Both of the length LVOS and the area AVOS are large when the downstream $O_2$ sensor is not deteriorated (FIG. 23, (5) and (7));
② The length LVOS is medium and the area AVOS is small when the downstream $O_2$ sensor has deteriorated (FIG. 23, (6) and (8)).

Accordingly, the ratio of the lengths LVOS/LVOM and the ratio of the areas take the values as shown in the right side columns of FIGS. 22 and 23. It will be understood that in the cases of FIG. 22, (3) (the catalyst is normal, the upstream $O_2$ sensor has deteriorated) and FIG. 23 (6) (both the catalyst and the downstream $O_2$ sensor have deteriorated), deterioration of the catalyst can not be determined by the ratio LVOS/LVOM only since LVOS/LVOM becomes medium in both cases in spite of the difference of the presence of the catalyst deterioration.

Even in these cases, the value of the ratio AVOS/AVOM is very large when the catalyst is not deteriorated (FIG. 22, (3)) and is small when the catalyst has deteriorated (FIG. 23, (6)). Therefore, by using the ratio AVOS/AVOM in addition to the ratio LVOS/LVOM, the deterioration of the catalyst can be detected even in these cases. In the method proposed by copending application Ser. No. 957,041, deterioration of the catalyst is detected based on the relationship of LVOS/LVOM and AVOS/AVOM explained above, i.e., for example, it is determined that the catalyst has deteriorated when the values LVOS/LVOM and AVOS/AVOM fall in the hatched area in the map shown in FIG. 24.

However, in the method explained above, the degree of the deterioration of the catalyst is not taken into consideration. Since the deterioration of the catalyst proceeds gradually, the catalyst still maintains sufficient capacity for removing some pollutants in the exhaust gas even though deterioration has already started. Therefore, it is necessary to distinguish these catalysts still having sufficient capacity (hereinafter, called "catalysts with a medium level of deterioration") from the catalysts in which deterioration proceeds largely and the capacity for removing pollutants becomes insufficient (hereinafter, called "catalysts with a high level of deterioration").

In the method explained above, it is found difficult to distinguish the catalyst with a medium level of deterioration from the catalyst with a high level of deterioration under some operating condition. This problem is explained with reference to FIGS. 1A through 3B in detail.

FIG. 2 shows examples of changes in the values of the ratios LVOS/LVOM and AVOS/AVOM in accordance with the level of the deterioration of the catalyst (medium level of deterioration or high level of deterioration), the condition of the downstream $O_2$ sensor (normal or deteriorated), and the operating condition of the engine (stable or transient), but, in all cases shown in FIG. 2, it is assumed that the upstream $O_2$ sensor is not deteriorated.

Nos. 1, 2, 5, 6 in FIG. 2 show the cases of transient operating condition of the engine such as during acceleration or deceleration, and Nos. 3, 4, 7, 8 show the cases of stable operating condition of the engine such as during constant load and constant speed operation, and the values LVOS/LVOM and AVOS/AVOM of these cases are shown in the right side of corresponding columns in FIG. 2. FIG. 3A indicates values LVOS/LVOM and AVOS/AVOM of cases 1 through 8 of FIG. 2 on the map of FIG. 24 used in U.S. application Ser. No. 957,041.

As seen from FIG. 3A, the values LVOS/LVOM and AVOS/AVOM of the catalyst with a high level of deterioration (cases No. 1 to No.4) are always in the hatched area of the map (i.e., determined as being deteriorated) regardless whether the operating condition of the engine is stable or transient. However, the values of the catalyst with a medium level of deterioration (cases No. 5 to No. 8) fall in different areas on the map depending on whether the operating condition of the engine is stable or transient.

For example, both No. (5) and No. (7) in FIGS. 2 and 3A represent the combination of a catalyst with a medium level of deterioration and a normal downstream $O_2$ sensor. However, when the operating condition of the engine is stable, the catalyst is determined as being deteriorated (FIG. 3A, No. (7)), though the same catalyst is determined as being normal when the operating condition is transient (FIG. 3A, No. (5)).

Also, in the cases No. (6) and No. (8) in FIGS. 2 and 3A (i.e., the combination of a catalyst with a medium level of deterioration and a deteriorated downstream $O_2$ sensor), the same catalyst is determined as being deteriorated when the operating condition is stable (FIG. 3A, No. (8)), and determined as being deteriorated when the operating condition is transient (FIG. 3A, No. (6)).

This means that, when the detection of deterioration of the catalyst is carried out in a stable operating condition, the catalyst with a medium level of deterioration, which still maintains practically sufficient capacity for removing pollutants in the exhaust gas, is determined to be in the same condition as the catalyst with a high level of deterioration which must be replaced as soon as possible.

The above difference in the result of the determination occurs because the value of the ratio of areas AVOS/AVOM tends to decrease during the stable operating condition of the engine (in other words, the ratio AVOS/AVOM increases during the transient operating condition) compared to the value during the transient operating condition. The reason why the ratio of the areas decreases during the stable operating condition is explained by referring FIGS. 1A through 1D.

FIGS. 1A through 1D show the waveforms of the output signal of the upstream $O_2$ sensor (FIGS. 1A and 1C) and the downstream $O_2$ sensor (FIGS. 1B and 1D) when the catalyst with a medium level of deterioration is used. Further, FIGS. 1A and 1B show the case when the operating condition of the engine is stable, and FIGS. 1C and 1D show the case when the operating condition of the engine is transient.

When the operating condition of the engine is transient, i.e., when the engine speed is accelerated or decelerated, the center value of the air-fuel ratio feedback control tends to deviate from the stoichiometric air-fuel ratio to the lean air-fuel ratio side (during acceleration) or the rich air-fuel ratio side (during deceleration). Consequently, it takes longer to adjust the center value to the stoichiometric air-fuel ratio by air-fuel ratio feedback control during the transition of the operating condition. This causes the period of the air-fuel ratio feedback control (represented by T in FIGS. 1A and 1C) to become longer. Also, the air-fuel ratio of the engine tends to deviate considerably from the stoichiometric air-fuel ratio during the transition of the operating condition (FIG. 1C). In this case also, the period of the fluctuation in the output signal of the $O_2$ sensor downstream of the catalyst with a medium level of deterioration becomes longer, and the output signal of the downstream $O_2$ sensor tends to deviate from the reference value corresponding to the stoichiometric air-fuel ratio (FIG. 1D).

On the other hand, when the operating condition of the engine is stable, the center value of the air-fuel ratio feedback control is easily adjusted to the stoichiometric air-fuel ratio and the air-fuel ratio of the engine oscillates regularly between the lean air-fuel ratio and the rich air-fuel ratio. Also, the period of the air-fuel ratio feedback control becomes shorter. In this case, the output signal of the $O_2$ sensor downstream of the catalyst with a medium level of deterioration fluctuates near the reference value corresponding to the stoichiometric air-fuel ratio, and the period of the fluctuation also becomes small.

In other words, the area AVOS of the output signal response curve of the downstream $O_2$ sensor in the normal operating condition decreases largely from the area in the transient operating condition (refer to FIGS. 1B and 1D), though the decrease in the area AVOM of the output signal response curve of the upstream $O_2$ sensor is relatively small (refer to FIGS. 1A and 1C).

This causes the ratio of the area AVOS/AVOM to become smaller in the stable operating condition than in the transient operating condition even though the level of the deterioration of the catalyst is the same (i.e., medium). On the other hand, the value of the ratio of the lengths LVOS/LVOM are maintained substantially the same in the stable operating condition and the transient operating condition, since both the length LVOS and LVOM equally increase when the operating condition becomes stable.

Though the above explanation is given for the case in which the downstream $O_2$ sensor is not deteriorated, the same phenomena occur also in the case of the combination of the deteriorated downstream $O_2$ sensor and the catalyst with a medium level of deterioration.

Therefore, during the stable operation of the engine, a problem occurs in that the catalyst with a medium level of deterioration is detected as being deteriorated in a similar manner as the catalyst with a high level of deterioration.

SUMMARY OF THE INVENTION

In view of the problems explained above, the object of the present invention is to provide a device for detecting deterioration of a catalytic converter, which is capable of distinguishing a catalyst with a medium level of deterioration which still has the ability remove pollutants from the exhaust gas from the catalyst with a high level of deterioration which requires replacement, accurately and in both the stable operating condition and in the transient operating condition.

According to the present invention, there is provided a device for detecting deterioration of a three-way catalytic converter disposed in an exhaust passage of an internal combustion engine equipped with an upstream air-fuel ratio sensor disposed in the exhaust passage upstream of the catalytic converter, a downstream air-fuel ratio sensor disposed in the exhaust passage downstream of the catalytic converter, and a feedback control means for controlling the air-fuel ratio of the engine by a feedback control based on, at least, the output of the upstream air-fuel ratio sensor.

The device comprises a means for calculating the ratio of the length of the output signal response curve of the downstream air-fuel ratio sensor and the length of the output signal response curve of the output signal response curve of the upstream air-fuel ratio sensor when the engine is controlled by the feedback control means, a means for calculating the ratio of the area bounded by the output signal response curve of the downstream air-fuel ratio sensor and a reference line thereof and the area bounded by the output signal response curve of the upstream air-fuel ratio sensor and a reference line thereof when the engine is controlled by the feedback control means, a transition determining means for determining the degree of transition of the operating condition of the engine, and a deterioration detecting means for detecting deterioration of the catalytic converter based on the ratio of the lengths, the ratio of the areas and the degree of transition of the operating condition of the engine.

BRIEF DESCRIPTION OF THE DRAWINGS

The present invention will be better understood from the description as set forth hereinafter, with reference to the accompanying drawings, in which:

FIG. 2 is a table illustrating the changes in the ratio of the lengths and the ratio of the areas, respectively, of the output signal response curves of upstream $O_2$ sensor and downstream $O_2$ sensor in accordance with the operating condition of the engine;

FIGS. 5A, 5B, 7A, 7B and 8 are flowcharts showing the routines for the air-fuel ratio feedback control carried out by the control circuit in FIG. 1;

FIGS. 6A through 6D are timing diagrams explaining the flowcharts of FIGS. 5A and 5B;

FIGS. 17 through 20 are flowcharts showing other embodiments of the routine of FIG. 14;

FIG. 22 is a table illustrating typical changes in the waveforms of the output signal response curves of the upstream $O_2$ sensor and downstream $O_2$ sensor caused by the deterioration of the $O_2$ sensors with a normal catalytic converter;

FIG. 23 is a drawing similar to FIG. 22, but with a deteriorated catalytic converter;

DESCRIPTION OF THE PREFERRED EMBODIMENT

Figure 4:
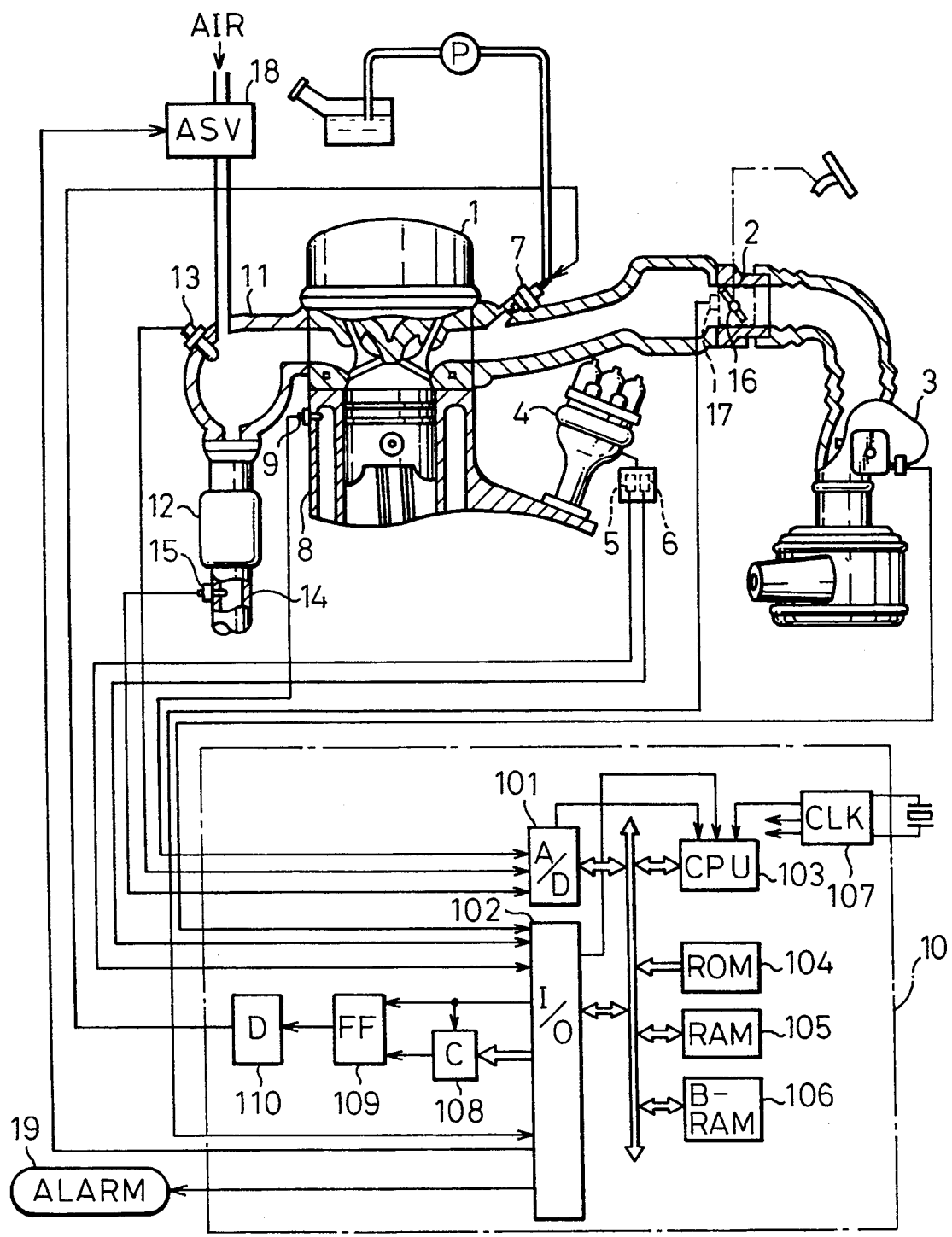
FIG. 4 is a schematic view of an internal combustion engine showing an embodiment of the present invention.

FIG. 4 schematically illustrates an embodiment of the device for detecting deterioration of the catalyst according to the present invention.

In FIG. 4, reference numeral 1 represents an internal combustion engine for an automobile. An air intake passage 2 of the engine 1 is provided with a potentiometer-type airflow meter 3 for detecting the amount of air drawn into the engine 1, and generates an analog voltage signal proportional to the amount of flowing therethrough. The signal from the airflow meter 3 is transmitted to a multiplexer-incorporating analog-to-digital (A/D) converter 101 of the control circuit 10.

Crank angle sensors 5 and 6, for detecting the angle of the crankshaft (not shown) of the engine 1, are disposed at a distributor 4 of the engine 1.

In this embodiment, the crank angle sensor 5 generates a pulse signal at every 720° crank angle and the crank angle sensor 6 generates a pulse signal at every 30° crank angle. The pulse signals from the crank angle sensors 5 and 6 are supplied to an input/output (I/O) interface 102 of the control circuit 10. Further, the pulse signal of the crank angle sensor 6 is then supplied to an interruption terminal of a central processing unit (CPU) 103.

In the intake passage 2, a fuel injection valve 7 is provided at an inlet port of each cylinder of the engine 1, for supplying pressurized fuel from the fuel system to the cylinders of the engine.

A coolant temperature sensor 9 for detecting the temperature of the coolant is disposed in a water jacket of a cylinder block 8 of the engine 1. The coolant temperature sensor 9 generates an analog voltage signal in response to the temperature THW of the coolant, and transmits this signal to the A/D converter 101 of the control circuit 10.

In the exhaust system, a three-way reducing and oxidizing catalytic converter 12 is disposed in the exhaust passage downstream of the exhaust manifold 11. The catalytic converter 12 has an $O_2$ storage capacity and is capable of removing three pollutants in the exhaust gas, i.e., CO, HC and $NO_x$, simultaneously.

An upstream O₂ sensor 13 is provided at the exhaust manifold 11, i.e., upstream of the catalytic converter 12.

A downstream O₂ sensor 15 is disposed at an exhaust pipe 14 downstream of the catalytic converter 12.

The upstream O₂ sensor 13 and the downstream O₂ sensor 15 generate output signals corresponding to the concentration of the oxygen component in the exhaust gas.

More specifically, the O₂ sensors 13 and 15 generate output voltage signals that change in accordance with whether the air-fuel ratio of the exhaust gas is rich or lean, compared to the stoichiometric air-fuel ratio. The signals output by the O₂ sensors 13 and 15 are transmitted to the A/D converter 101 of the control circuit 10.

The control circuit 10, which may consist of a microcomputer, further comprises a central processing unit (CPU) 103, a read-only-memory (ROM) 104 for storing a main routine and interrupt routines such as a fuel injection routine and an ignition timing routine, and constants, etc., a random-access-memory (RAM) 105 for storing temporary data, a backup RAM 106, and a clock generator 107 for generating various clock signals. The backup RAM 106 is directly connected to a battery (not shown), and therefore, the contents of the backup RAM 106 are preserved even when the ignition switch (not shown) is turned off.

A throttle valve 16 operated by a vehicle driver, is provided in the intake air passage 2, together with an idle switch 17 for detecting the opening of the throttle valve and generating a signal ("LL signal") when the throttle valve 16 is fully closed. This LL signal is supplied to the I/O interface 102 of the control circuit 10.

Reference 18 designates a secondary air supply valve for introducing secondary air to the exhaust manifold 11, thereby reducing the emission of HC and CO during a deceleration or an idling operation of the engine.

Reference 19 designates an alarm that is activated when the catalytic converter 12 is determined as being deteriorated.

A down counter 108, a flip-flop 109, and a drive circuit 110 are provided in the control circuit 10 for controlling the fuel injection valve 7.

When a fuel injection amount TAU is calculated in a routine, as explained later, the amount TAU is preset in the down counter 108, and simultaneously, the flip-flop 109 is set, and as a result, the drive circuit 110 initiates the activation of the fuel injection valve 7.

On the other hand, the down counter 108 counts up the clock signal from the clock generator 107, and finally, a logic 1 signal is generated from the terminal of the down counter 108, to reset the flip-flop 109, so that the drive circuit 110 stops the activation of the fuel injection valve 7, whereby an amount of fuel corresponding to the fuel injection amount TAU is supplied to the cylinders.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q from the airflow meter 3 and the coolant temperature data THW from the coolant sensor 9 are fetched by an A/D conversion routine(s) executed at predetermined intervals, and then stored in the RAM 105; i.e., the data Q and THW in the RAM 105 are updated at predetermined intervals. The engine speed Ne is calculated by an interruption routine executed at every 30° crank angle, i.e., at every pulse signal of the crank angle sensor 6, and is stored in the RAM 105.

The operation of the control circuit 10 of FIG. 4 is now explained.

Figure 5A:
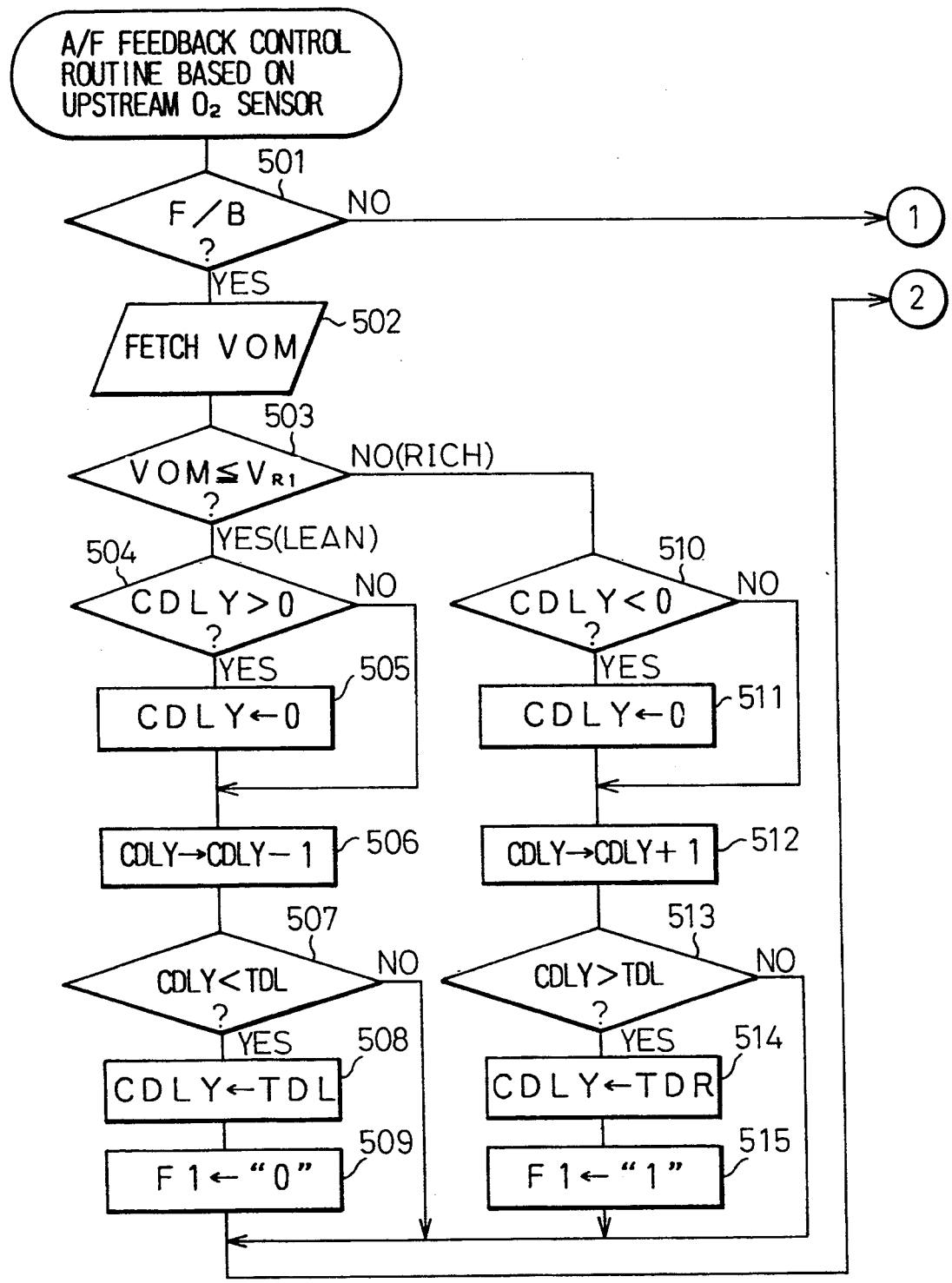
Figure 5B:
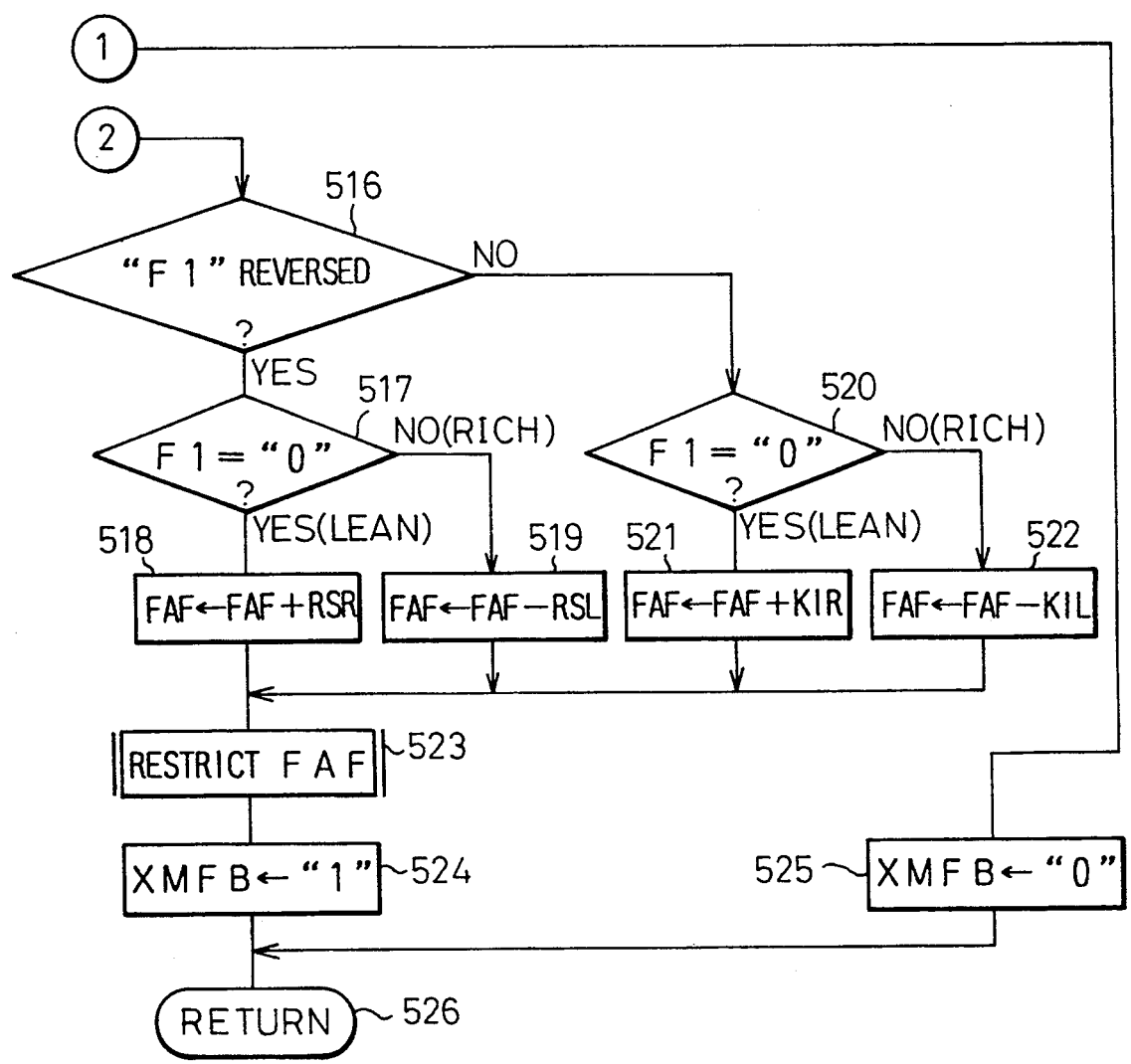

FIGS. 5A and 5B show a routine for the air-fuel ratio feedback control. This routine calculates an air-fuel ratio correction factor FAF in accordance with the output VOM of the upstream O₂ sensor 13, and is executed at predetermined intervals of, for example, 4 ms.

At step 501 in FIG. 5A, it is determined whether or not all conditions for the air-fuel ratio feedback control are satisfied. The conditions for the feedback control are, for example,

- the engine is not in the starting operation.
- the coolant temperature is higher than a predetermined value,
- the air-fuel ratio enrichment, such as start-up air-fuel ratio enrichment, warming-up air-fuel ratio enrichment, power air-fuel ratio enrichment, or OTP air-fuel ratio enrichment, for preventing an excess rise in the temperature of the catalytic converters, is not being carried out,
- the output of the upstream O₂ sensor 13 has been reversed (i.e., changed from a rich air-fuel ratio output signal to a lean air-fuel ratio output signal, or vice versa) at least once,
- a fuel cut operation is not being carried out.

If any one of these conditions is not satisfied, the routine proceeds to step 525 in FIG. 5B, which causes an air-fuel ratio feedback control flag XMFB to be 0 and the routine terminates at step 526 in FIG. 5B.

If all of the conditions for the air-fuel ratio feedback control are satisfied at step 501, the routine proceeds to step 502.

At step 502, an A/D conversion is performed upon receiving the output voltage VOM from the upstream O₂ sensor 13, and the A/D converted value thereof is then fetched from the A/D converter 101. Then, at step 503, the voltage VOM is compared with a reference voltage $V_{R1}$ to thereby determine whether the current air-fuel ratio detected by the upstream O₂ sensor 13 is on the rich side or on the lean side with respect to the stoichiometric air-fuel ratio. The reference voltage $V_{R1}$ is usually set at or near the center value of the maximum amplitude of the output of the O₂ sensor in this embodiment, $V_{R1}$ is set at 0.45 V.

If VOM ≤ $V_{R1}$, which means that the current air-fuel ratio is lean, the control proceeds to step 504, at which step it is determined whether or not the value of a delay counter CDLY is positive. If CDLY > 0, the control proceeds to step 505, which clears the delay counter CDLY, and then proceeds to step 506. At step 506, the delay counter CDLY is counted down by 1, and at step 507, it is determined whether or not CDLY < TDL. Note that TDL is a lean delay time for which a rich state is maintained even after the output of the upstream O₂ sensor 13 is changed from the rich side to the lean side, and is defined by a negative value. Therefore, at step 507, only when CDLY < TDL does the control proceed to step 508, which causes CDLY to be TDL, and then to step 509, which causes an air-fuel ratio flag F1 to be set to zero (lean state).

On the other hand, if VOM > $V_{R1}$, which means current air-fuel ratio is rich, the control proceeds to step 510, which determines whether or not the value of the delay counter CDLY is negative. If CDLY < 0, the control proceeds to step 511, which clears the delay counter CDLY, and then proceeds to step 512. If CDLY≧0, the control directly proceeds to step 512.

At step 512, the delay counter CDLY is counted up by 1, and at step 513, it is determined whether or not CDLY>TDR. Note that TDR is a rich delay time for which a lean state is maintained even after the output of the upstream $O_2$ sensor 13 is changed from the lean side to the rich side, and is defined by a positive value. Therefore, at step 513, but only when CDLY>TDR, the control proceeds to step 514, which causes CDLY to set to be TDR, and then proceeds to step 515, which causes an air-fuel ratio flag F1 to be 1 (rich state).

At step 516 in FIG. 5B, it is determined whether or not the air-fuel ratio flag F1 has reversed (changed from 0 to 1, or 1 to 0), i.e., whether or not the delayed air-fuel ratio detected by the upstream $O_2$ sensor 13 has reversed. If the air-fuel ratio flag F1 has reversed, the control proceeds to steps 517 to 519, and a skip operation is carried out. That is, the flag F1 is 0 (lean) at step 517, the control proceeds to step 518, which increases the correction factor FAF by a skip amount RSR. If the flag F1 is 1 (rich) at step 517, the control proceeds to step 519, which reduces the correction factor FAF by a skip amount RSL.

If the air-fuel ratio flag F1 has not reversed at step 516, the control proceeds to steps 520 to 522, which carry out an integration operation. That is, if the flag F1 is 0 (lean) at step 520, the control proceeds to step 521, which gradually increases the correction factor FAF by a rich integration amount Also, if the flag F1 is 1 (rich) at step 520, the control proceeds to step 522, which gradually decreases the correction factor FAF by a lean integration amount KIL.

Then, at step 523, the air-fuel ratio correction factor FAF is restricted, for example, to a minimum value of 0.8 and to a maximum value of 1.2, thereby preventing the controlled air-fuel ratio from becoming overrich or overlean.

The correction factor FAF is then stored in the RAM 105 and the control proceeds to step 524, which causes the air-fuel ratio feedback control flag XMFB to be 1, and the routine then terminates at step 526.

The control operation in the flowcharts of FIGS. 5A and 5B is further explained with reference to FIGS. 6A through 6D. As illustrated in FIG. 6A, when the air-fuel ratio signal A/F is obtained by the output of the upstream $O_2$ sensor 13, the delay counter CDLY is counted up when in a rich state, and is counted down when in a lean state, as illustrated in FIG. 6B. As a result, a delayed air-fuel ratio corresponding to the air-fuel ratio flag F1 is obtained as illustrated in FIG. 6C. For example, at time $t_1$, even when the air-fuel ratio A/F is changed from the lean side to the rich side, the delayed air-fuel ratio A/F' (F1) is changed at time $t_2$ after the rich delay time TDR. Similarly, at time $t_3$, even when the air-fuel ratio A/F is changed from the rich side to the lean side, the delayed air-fuel ratio A/F' (F1) is changed at time $t_4$ after the lean delay time TDL. At time $t_5$, $t_6$, or $t_7$, however, when the air-fuel ratio A/F is reversed in a shorter time than the rich delay time TDR or the lean delay time TDL, the delayed air-fuel ratio F1 is reversed at time $t_8$. That is, the delayed air-fuel ratio A/F' (F1) is stable when compared with the air-fuel ratio A/F. Further, as illustrated in FIG. 4D, at every change of the delayed air-fuel ratio F1 from the rich side to the lean side, or vice versa, the correction factor FAF is skipped by the skip amount RSR or RSL, and the correction factor FAF is gradually increased or decreased in accordance with the delayed air-fuel ratio F1.

Next, the air-fuel ratio feedback control of the double $O_2$ sensor system, in which the air-fuel ratio is controlled based on the output VOS of the downstream sensor 15 as well as the output VOM of the upstream sensor 13, is explained.

Generally, three types of air-fuel ratio feedback control operations by the downstream $O_2$ sensor 15 are used, i.e., the operation type in which one or more of the parameters such as the skip amounts RSR, RSL, integration amounts KIR, KIL and delay times TDR, TDL are variable, and the operation type in which the reference voltage $V_{R1}$ of the outputs VOM of the upstream $O_2$ sensor is variable, or the operation type in which a second air-fuel ratio correction factor FAF2 calculated in accordance with the output of the downstream $O_2$ sensor 15 is introduced.

For example, if the rich skip amount RSR is increased or if the lean skip amount RSL is decreased, the controlled air-fuel ratio becomes richer, and if the lean skip amount RSL is increased or if the rich skip amount RSR is decreased, the controlled air-fuel ratio becomes leaner. Thus, the air-fuel ratio can be controlled by changing the rich skip amount RSR and the lean skip amount RSL in accordance with the output of the downstream $O_2$ sensor 15. Further, if the rich integration amount KIR is increased or if the lean integration amount KIL is decreased, the controlled air-fuel ratio becomes richer, and if the lean integration amount KIL is increased or if the rich integration amount KIR is decreased, the controlled air-fuel ratio becomes leaner. Thus, the air-fuel ratio can be controlled by changing the rich integration amount KIR and the lean integration amount KIL in accordance with the output of the downstream $O_2$ sensor 15. Further, if the reference voltage $V_{R1}$ is increased, the controlled air-fuel ratio becomes richer, and if the reference voltage $V_{R1}$ is decreased, the controlled air-fuel ratio becomes leaner. Thus, the air-fuel ratio can be controlled by changing the reference voltage $V_{R1}$ in accordance with the output of the downstream $O_2$ sensor 15.

Also, if the rich delay time becomes longer than the lean delay time (i.e., TDR>TDL), the controlled air-fuel ratio becomes richer, and if the lean delay time becomes longer than the rich delay time (i.e., TDL>TDR), the controlled air-fuel ratio becomes leaner. Thus, the air-fuel ratio can be controlled by changing the rich delay time TDR and the lean delay time TDL in accordance with the output of the downstream $O_2$ sensor 15.

These types of air-fuel ratio control operations have respective advantages. For example, if the delay times TDR, TDL are variable, a precise control of the air-fuel ratio can be obtained, and if the skip amounts RSR, RSL are variable, the response of the control is improved. Naturally, two or more of these types of operation can be used at the same time.

Figure 7B:
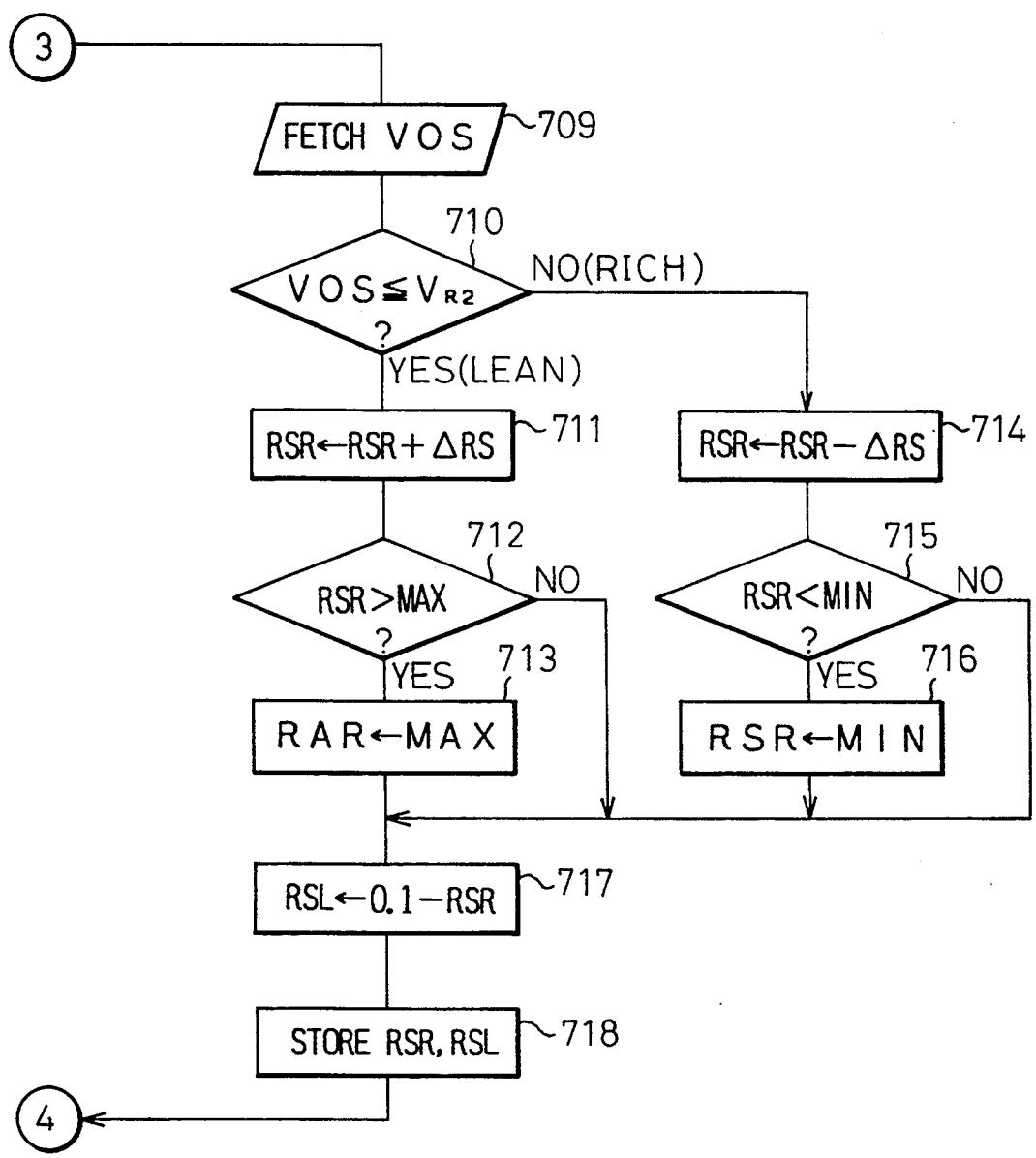

FIGS. 7A and 7B show a flow chart of the control operation of the double $O_2$ sensor system in which the skip amounts RSR, RSL are varied in accordance with the output VOS of the downstream $O_2$ sensor 15. This routine is executed at predetermined intervals of, e.g., 512 ms.

The steps from 701 to 706 of FIG. 7A show the operation for determining whether or not the conditions for executing the feedback control based on the output of the downstream O₂ sensor 15 are satisfied.

These conditions are, the conditions for executing the air-fuel ratio feedback control based on the output of the upstream O₂ sensor 13 are satisfied (the air-fuel ratio feedback control flag XMFB=1 at step 701), the temperature THW of the coolant is higher than a predetermined value, (step 702);

the throttle valve 16 is not fully closed (i.e., the signal LL is not ON) (step 703);

the secondary air AS is not introduced into the exhaust manifold (step 704);

the load of the engine represented by Q/Ne (an amount of intake air per one revolution of the engine) is more than a predetermined value $X_1$ (i.e., Q/Ne≧$X_1$), (step 705);

the downstream O₂ sensor 15 is activated (step 706).

If any one of these conditions are not satisfied, the routine proceeds to step 719 which resets (=0) the air-fuel ratio feedback control flag XFSB.

If all of the conditions of steps 701 to 706 are satisfied, the flag XSFB is set (=1) at step 708, and the routine proceeds to step 709 in FIG. 7B.

The steps 709 through 718 illustrate the operation for calculating the skip amounts RSR or RSL in accordance with the output VOS of the downstream O₂ sensor 15.

At step 709, an A/D conversion is performed on the output voltage VOS of the downstream O₂ sensor 15, and the A/D converted value thereof is then fetched from the A/D converter 101. At step 710, the voltage VOS is compared with a reference voltage $V_{R2}$ to determine whether the current air-fuel ratio detected by the downstream O₂ sensor 15 is on the rich side or on the lean side with respect to the stoichiometric air-fuel ratio. Note that the reference voltage $V_{R2}$ is preferably higher than the reference voltage $V_{R1}$ (=0.45 V), in consideration of the difference in output characteristics and deterioration speed between the O₂ sensor 13 upstream of the catalytic converter and the O₂ sensor 15 downstream of the catalytic converter. In this embodiment, the reference voltage $V_{R2}$ is set, for example, at 0.55 v.

If VOS≦$V_{R2}$ (lean state) at step 710, then the routine proceeds to steps 711 to 713, and if VOS>$V_{R2}$ (rich state), the routine proceeds to steps 714 to 716. Namely, at step 711, the rich skip amount RSR is increased by Δ RS (constant value), thereby shifting the air-fuel ratio to the rich side. Then, at steps 712 and 713, the rich skip amount RSR is restricted to a maximum value MAX (e.g., approximately 0.075). On the other hand, at step 714, the rich skip amount is decreased by Δ RS, thereby shifting the air-fuel ratio to the lean side. Then, at steps 715 and 716, the rich skip amount RSR is restricted to a minimum value MIN (e.g., approximately 0.025). The maximum value MAX is selected so that the amount of change of the air-fuel ratio is maintained within a range that does not deteriorate driveability, and the minimum value MIN is selected so that the response of the control in a transient operating condition is not lowered.

At step 717, the lean skip amount RSL is calculated by $$RSL = 0.1 - RSR.$$

Namely, a sum of RSR and RSL is maintained at 0.1. Then at step 718, the skip amounts RSR and RSL are stored in the backup RAM 106, and the routine terminates at step 720 in FIG. 7A.

Figure 8:
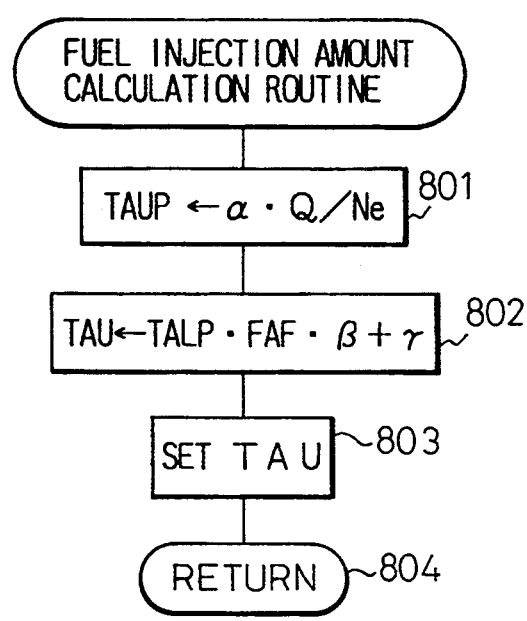

FIG. 8 shows a routine for calculating the fuel injection amount using the air-fuel ratio correction factor FAF calculated by the routine of FIGS. 5A and 5B.

At step 801, a basic fuel injection amount TAUP is calculated in accordance with the amount of the intake air per one revolution of the engine, i.e., Q/Ne, by $$TAUP = \alpha \cdot Q/Ne$$

where, TAUP is the fuel injection amount required to obtain the stoichiometric air-fuel ratio and $\alpha$ is a predetermined constant.

Then, at step 802, a fuel injection amount TAU is calculated by $$TAU = TAUP \cdot FAF \cdot \beta + \gamma$$

where, $\beta$ and $\gamma$ are correction factors determined by operating conditions of the engine. The calculated TAU is set to the down counter 108, and a flip-flop 109 is set at step 803, whereby fuel injection is started.

As stated before, when the time corresponding to TAU has lapsed, the flip-flop 109 is reset by the signal from the down counter 108, whereby the fuel injection is terminated.

Next, the detection of deterioration of the catalytic converter carried out by the control circuit 10 is explained using FIGS. 9 through 13.

As explained before, the ratio of the areas AVOS/AVOM increases during the transient operating condition of the engine compared to the ratio during the stable operation, though the ratio of the lengths LVOS/LVOM is substantially maintained. Further, when the change in the operating condition is larger, the period of air-fuel ratio feedback control during the transient operating condition becomes larger, and as seen from FIGS. 1A through 1D, the increase in the ratio AVOS/AVOM also becomes larger. Namely, the increase in the ratio AVOS/AVOM becomes larger as the degree of transition of the operating condition increases.

Figure 9:
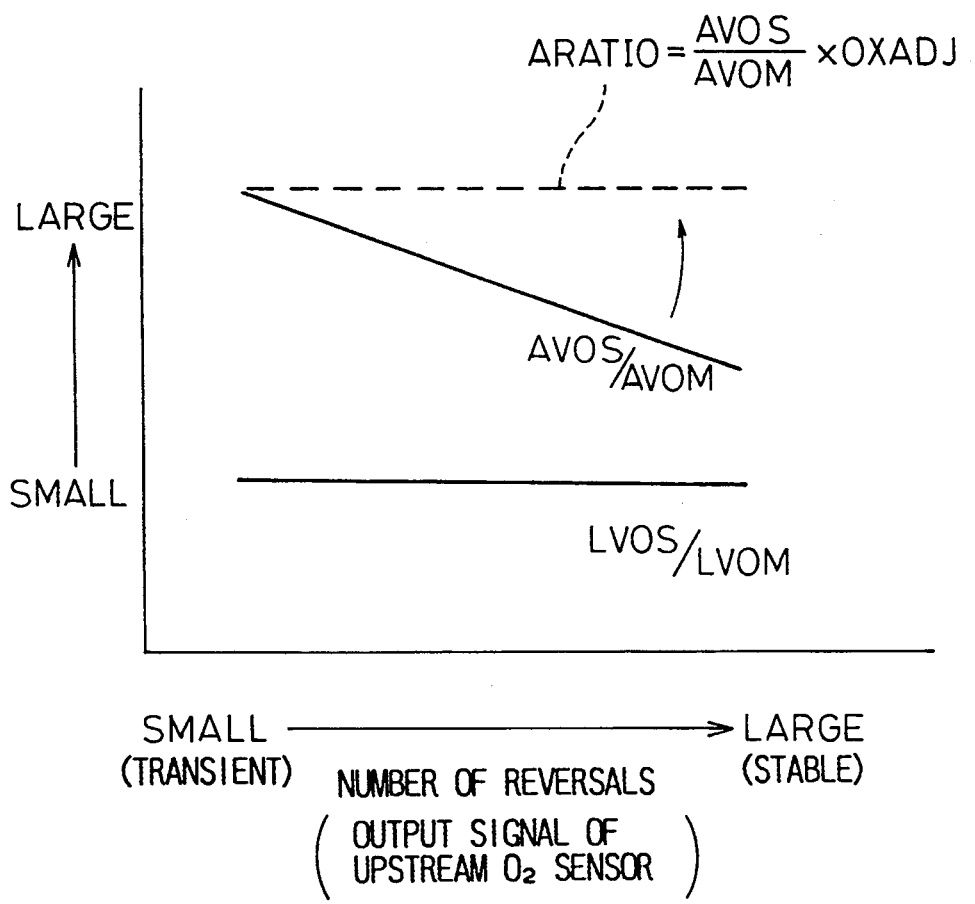
FIG. 9 is a diagram explaining the changes in the ratio of the lengths and the ratio of the areas, respectively, of the output signal response curves of the upstream $O_2$ sensor and the downstream $O_2$ sensor in the transient operating condition of the engine.

FIG. 9 shows the change in the values of the ratios LVOS/LVOM and AVOS/AVOM for the same catalyst (medium level of deterioration) in accordance with number of reversals of the output signal of the upstream O₂ sensor within a predetermined time. As seen from FIG. 9, the value of AVOS/AVOM increases as the number of the reversals decreases (i.e., as the period of the air-fuel ratio feedback control becomes longer), though the value of LVOS/LVOM is maintained substantially the same. Therefore, in this embodiment, the ratio of the area AVOS/AVOM is corrected in accordance with the degree of the transition of the operating condition of the engine using the number of the reversal of the output signal of the upstream O₂ sensor as a parameter representing the degree of the transition of the operating condition, to thereby prevent the catalyst with a medium level of deterioration from being determined as deteriorated.

Figure 10:
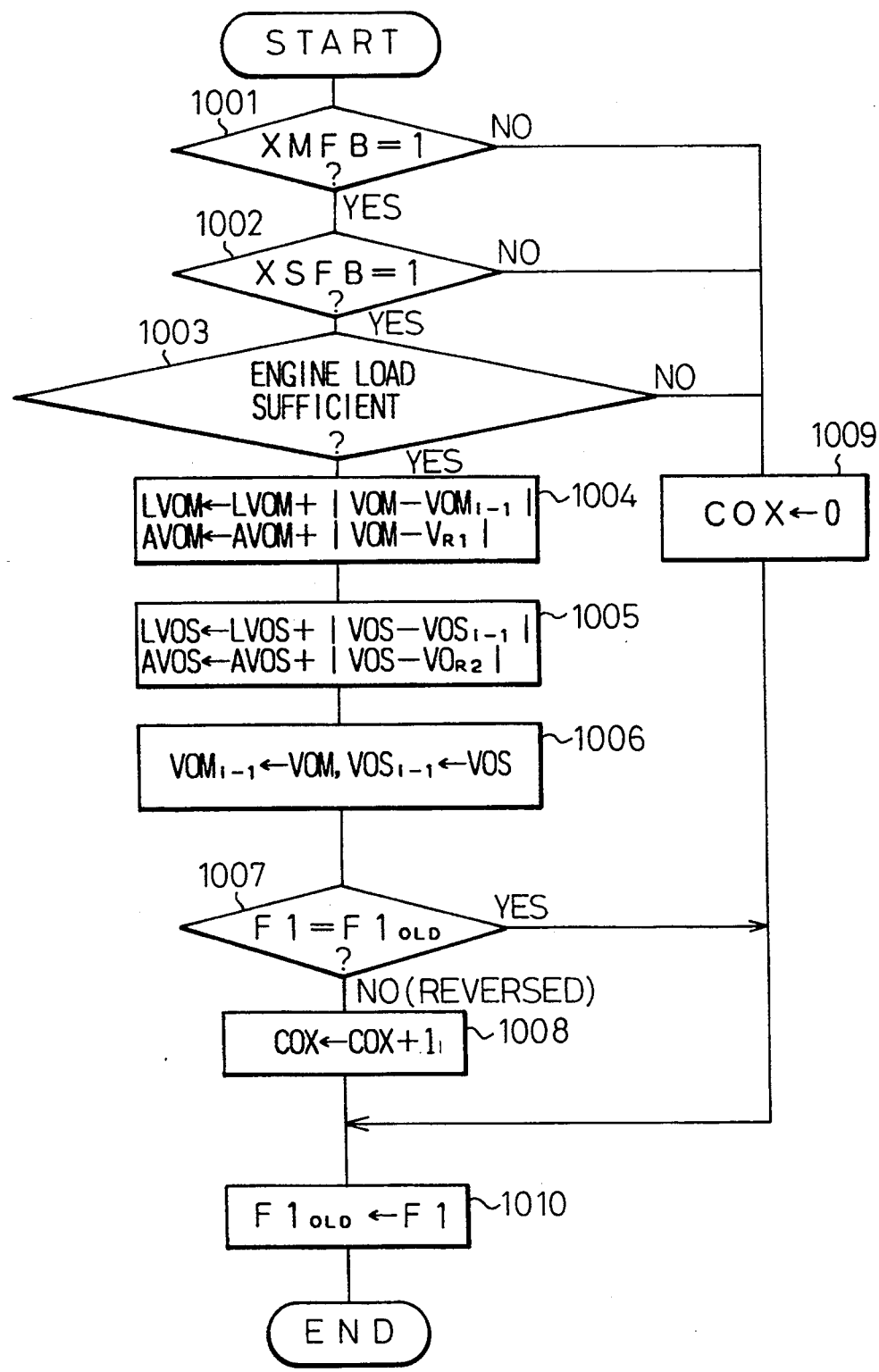
FIGS. 10 and 11A, 11B are flowcharts showing an embodiment of the routines for detecting deterioration of the catalytic converter.

FIG. 10 shows the routine for calculating the lengths LVOS and LVOM and the areas AVOS and AVOM used for detecting deterioration of the catalyst. This routine is executed by the control circuit 10 at predetermined intervals (for example, 4 ms).

When the routine started, at steps 1001 through 1003 it is determined whether or not the conditions for calculating the lengths and areas are satisfied.

These conditions are, the air-fuel ratio feedback control based on the output of the upstream O₂ sensor 13 is being carried out (the air-fuel ratio feedback control flag XMFB=1 at step 1001), the air-fuel ratio feedback control based on the output of the downstream O₂ sensor 15 is being carried out (the air-fuel ratio feedback control flag XSFB=1 at step 1002), the engine operating load is more than a predetermined value (step 1003).

The engine operating load must be more than a predetermined value to detect deterioration of the catalyst accurately, since, if the operating load of the engine is low, the catalyst may not be activated due to low exhaust gas temperature and a catalyst in a normal condition may be detected as a deteriorated catalyst.

If any one of these conditions are not satisfied, the routine proceeds to step 1009 which clears a counter COX, and the routine terminates immediately. Where, as explained later, COX is a counter for counting number of reversals of the output signal of the upstream O₂ sensor between the rich state signal and the lean state signal, and used as a parameter representing the degree of transition of the operating condition of the engine.

If all of these conditions are satisfied, the routine proceeds to step 1004 which calculates the length LVOM of the output signal response curve of the upstream O₂ sensor 13 and the area AVOM bounded by the output response curve of the upstream O₂ sensor 13 and the reference voltage line $V_{R1}$ by;

$$LVOM = LVOM + |VOM - VOM_{i-1}|$$

$$AVOM = AVOM + |VOM - V_{R1}|$$

In the above calculation, $VOM_{i-1}$ is the value of the output VOM when the routine was last executed.

Figure 25:
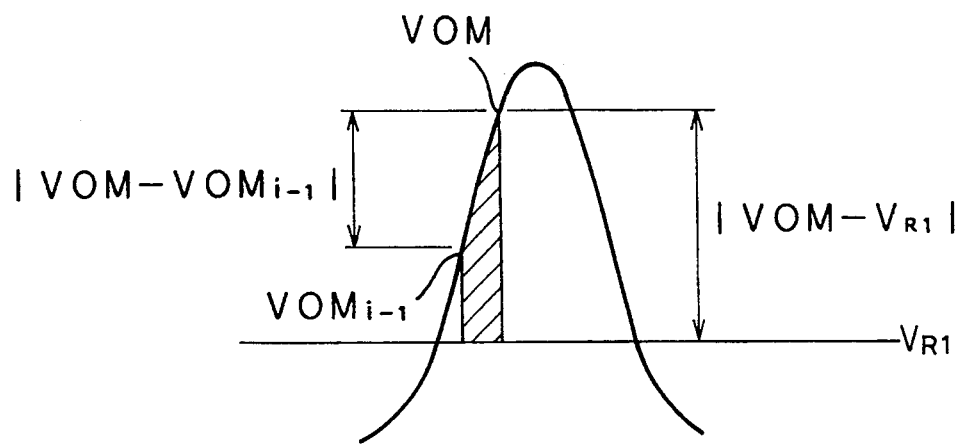
FIG. 25 is a diagram explaining the length LVOM and the area AVOM of the output signal response curve of the upstream $O_2$ sensor.

In this embodiment, as schematically shown in FIG. 25, the value $|VOM - VOM_{i-1}|$ represents the length of a fragment of the response curve of the output signal VOM corresponding to the interval of the execution of the routine, and the value $|VOM - V_{R1}|$ represents the area bounded by said fragment and the reference voltage line (i.e., hatched portion in FIG. 25). Note that, the sampling interval between $eVOM_{i-1}$ and VOM is shown much longer than actual, compared to the oscillation period of the output in FIG. 25. Also, note that the length LVOM and the area AVOM may be calculated more precisely by taking the shape of the response curve into consideration.

At step 1005, the length LVOS and the area AVOS of the output signal response curve of the downstream O₂ sensor 15 are calculated in the same manner by;

$$LVOS = LVOS + |VOS - VOS_{i-1}|$$

$$AVOS = AVOS + |VOS - V_{R2}|$$

where, $VOS_{1-1}$ is the value of the output VOS when the routine was last executed.

After calculating LVOM, AVOM and LVOS, AVOS, the values $VOM_{i-1}$ and $VOS_{i-1}$ are updated to prepare for the next execution of the routine.

Steps 1007 and 1008 show the operation for counting the number of reversals of the output signal of the upstream O₂ sensor 13. At step 1007, it is determined whether or not the output signal VOM of the upstream O₂ sensor reversed, by comparing the current value of flag F1 with the value $F1_{OLD}$, where $F1_{OLD}$ represents the value of F1 when the routine was last executed. If F1 is not equal to $F1_{OLD}$, i.e., if the output VOM reversed, the counter COX is increased by 1 at step 1008. If F1 is equal to $F1_{OLD}$, i.e., if the output VOM is not reversed, the counter COX is maintained at same value. In both cases, the value of $F1_{OLD}$ is updated at step 1010 to prepare for the next execution of the routine.

By executing the routine in FIG. 10, LVOM, LVOS and AVOM, AVOS represent cumulative value of the length and the areas of the output signal response curves of the upstream O₂ sensor and downstream O₂ sensor.

Figure 11A:
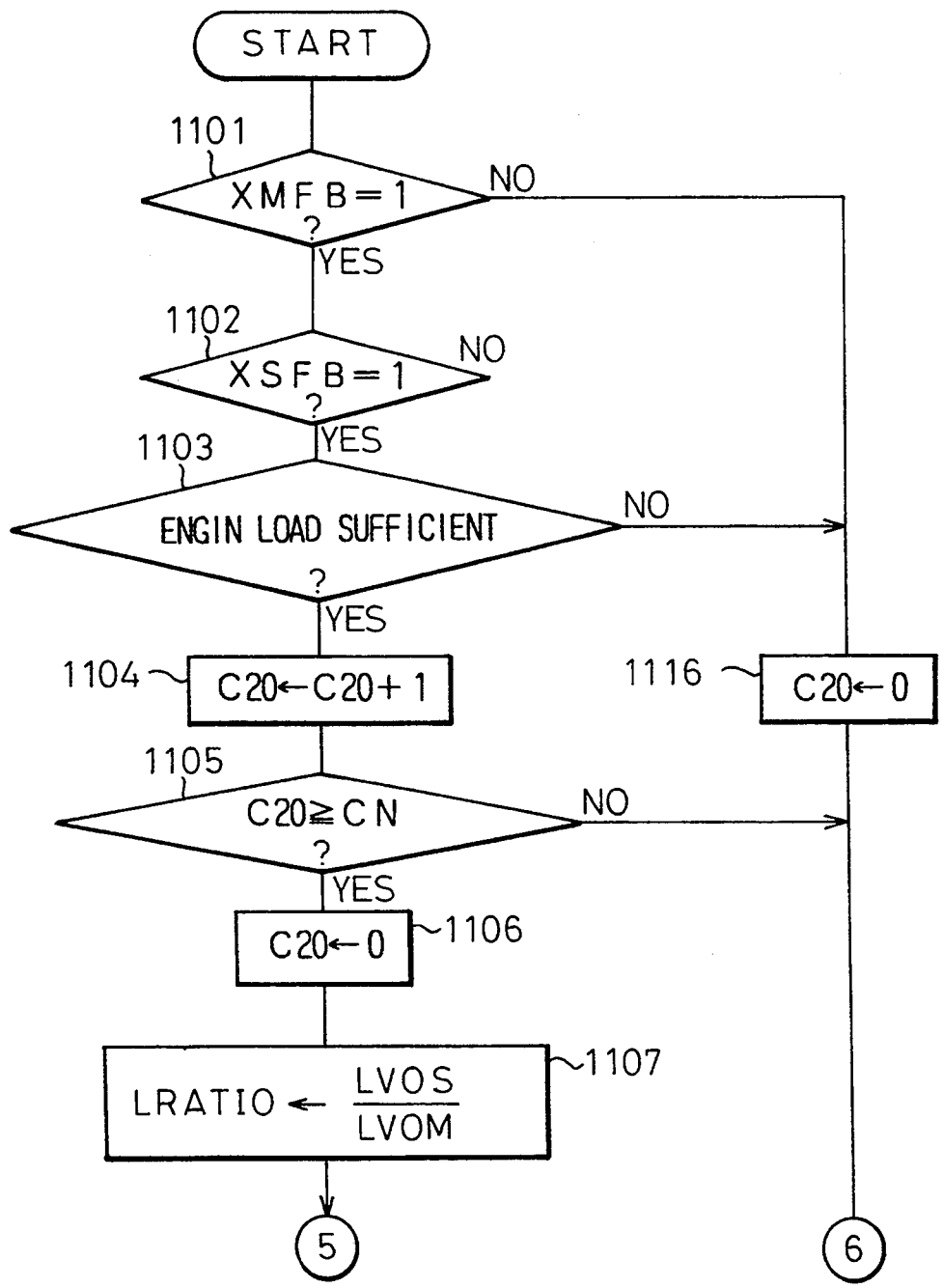
Figure 11B:
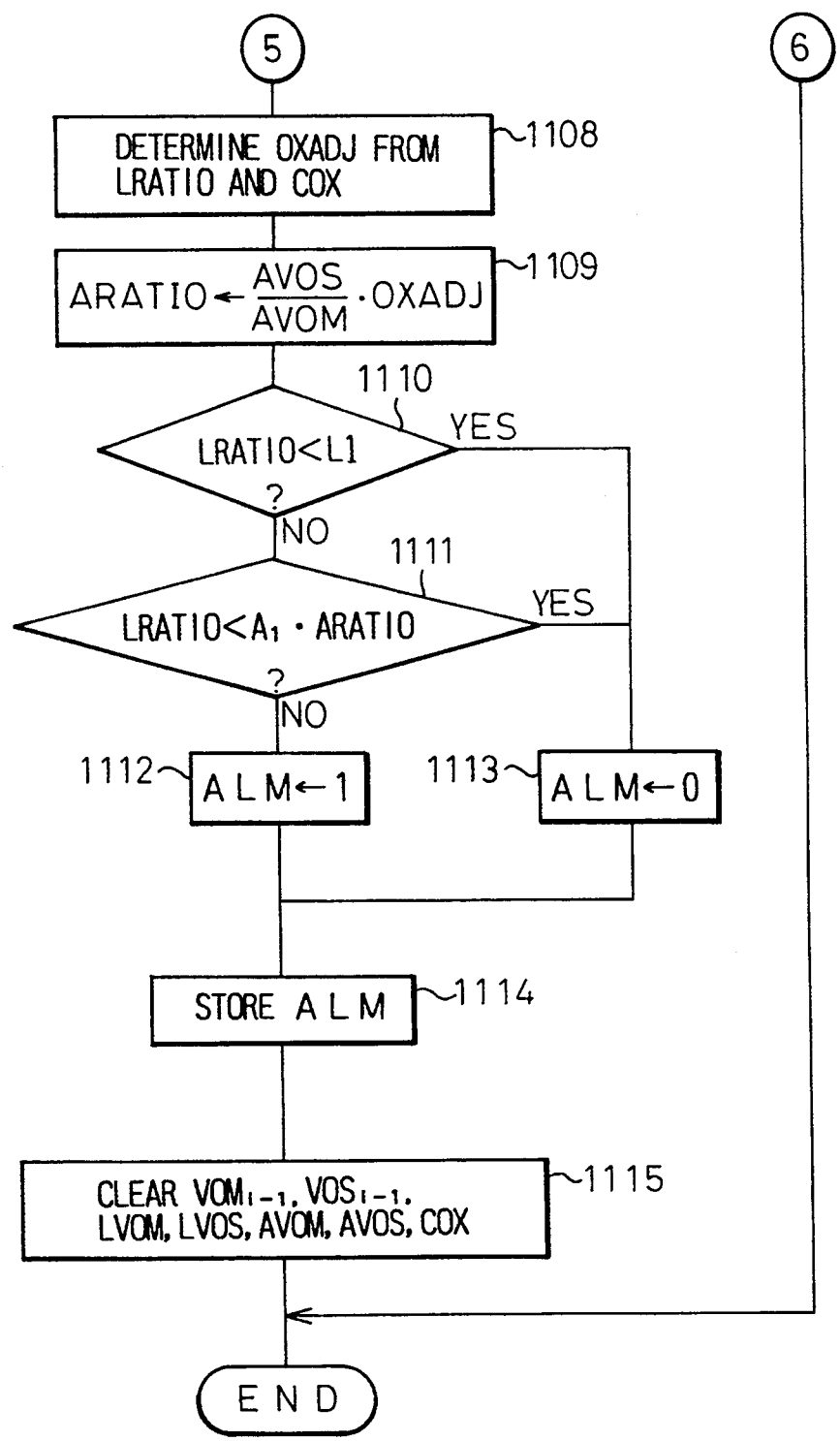

FIGS. 11A and 11B show a routine for detecting deterioration of the catalyst based on the lengths LVOM, LVOS, the areas AVOM, AVOS and the degree of transition of the operating condition of the engine COX. This routine is executed by the control circuit 10 at predetermined intervals (for example, 50 to 65 ms).

When the routine started, at steps 1101 to 1103 in FIG. 11A, it is determined whether or not the conditions for executing the detecting operation is satisfied. The conditions are exactly the same as those in steps 1001 to 1003 in FIG. 10.

If any one of these conditions are not satisfied, the routine proceeds to step 1116 which causes a counter C20 to be cleared, and the routine terminates immediately. If all of the conditions are satisfied, the routine proceeds to step 1104 which increases the value of the counter C20 by 1, and at step 1105, it is determined whether or not the value of the counter C20 is more than or equal to a predetermined value CN. Where, the counter C20 counts number of execution of the routine, and the value of the counter C20 represents a cumulative time in which the conditions in steps 1101 to 1103 are satisfied. The predetermined value CN in step 1105 corresponds to the number of the routine executed within 20 seconds.

If the value C20 is smaller than CN at step 1105, i.e., if the cumulative time is less than 20 seconds, the routine terminates immediately. Namely, the determination of the deterioration of the catalyst is not carried out until the cumulative time in which the conditions are satisfied becomes 20 seconds.

If the value C20 is more than or equal to CN at step 1105, the routine proceeds to step 1106 which clears the counter C20, then to step 1107 which calculates the ratio LRATIO of the lengths LVOS/LVOM using LVOS and LVOM calculated by the routine in FIG. 10.

Then, at step 1108 in FIG. 11B, a correction factor OXADJ is determined based on LRATIO and the degree of transition of the operating condition COX obtained at steps 1107 and 1104, respectively, and a corrected ratio of the areas ARATIO is obtained at step 1109 by, $$ARATIO = AVOS/AVOM \times OXADJ$$

As explained before, the ratio of the areas AVOS/AVOM becomes larger as the degree of transition of the operating condition increases (in other word, AVOS/AVOM becomes smaller as the degree of transition of the operating condition decreases). Therefore, the value of the correction factor is determined in accordance with the value of COX in such manner that the value of OXADJ becomes larger as the value of COX increases (refer to FIG. 9). By correcting the ratio of the areas AVOS/AVOM using the correction factor OXADJ, the phenomenon that the ratio AVOS/AVOM decreases as the operating condition approachs stable condition is corrected, to thereby eliminates the effect of the operating condition of the engine.

At step 1108 in FIG. 11B, the ratio of the lengths LRATIO is also taken into consideration when determining the value of the correction factor OXADJ in addition to the degree of transition of the operating condition. The reason for this is, because if the ratio of the areas AVOS/AVOM is increased uniformly when the operating condition approaches stable condition, the ratio of areas is increased also in the case of the catalyst with a high level of deterioration (such as Nos. (1) and (3) in FIG. 3A), and this may cause the catalyst with a high level of deterioration to be determined incorrectly as being normal condition. Since the ratio of the lengths LRATIO becomes larger as the deterioration of the catalyst proceeds (refer to FIG. 2), the correction factor OXADJ is determined also in accordance with the value of LRATIO in such manner that, when the operating condition approaches to stable condition, OXADJ decreases as the value of LRATIO increases (i.e., as the deterioration of the catalyst proceeds), to thereby eliminate the possibility that the catalyst with a high level of deterioration is incorrectly determined as being normal condition.

Figure 12:
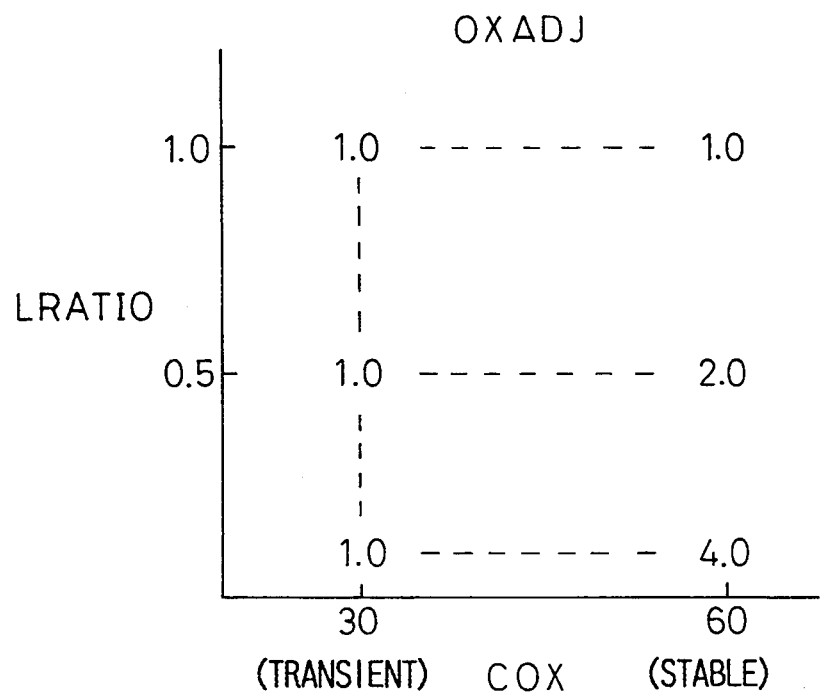
FIG. 12 shows an example of the values of the correction factor used in FIGS. 11A and 11B.

FIG. 12 shows an example of the values of OXADJ used in this embodiment. The values of OXADJ are stored in the ROM 104 in the engine control circuit 10 in the form of a numerical table of LRATIO and COX as shown in FIG. 12, and at step 1108 in FIG. 11B, OXADJ is read from the numerical table using the values of LRATIO and COX. As seen from FIG. 12, OXADJ takes minimum value of 1.0 when the degree of the transition is very large (for example, COX=30 in FIG. 12), and takes larger value as the value of COX increase (i.e., as the degree of transition of the operating condition decreases). Also, the value of OXADJ decreases from 1.0 when the value of LRATIO decreases.

Figure 1A:
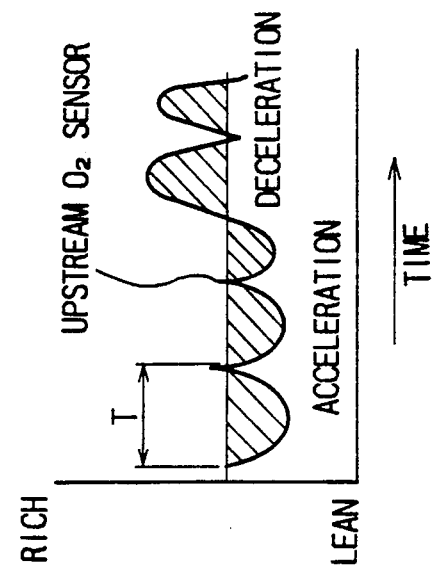
FIGS. 1A through 1D are drawings explaining the changes in the waveforms of the output signals of the upstream $O_2$ sensor and downstream $O_2$ sensor in accordance with the operating condition of the engine when the deterioration of the catalyst is medium level.
Figure 1B:
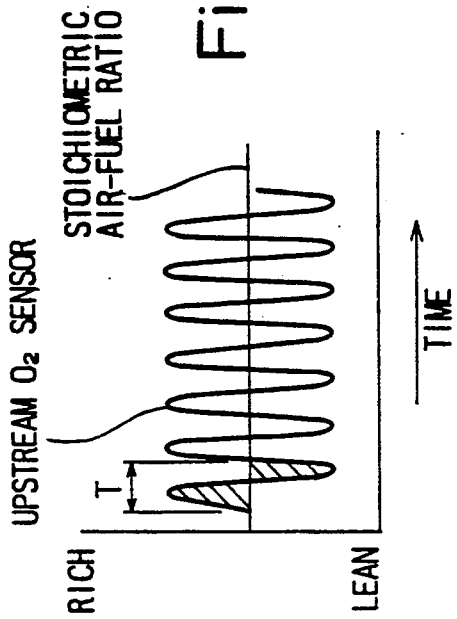
Figure 1C:
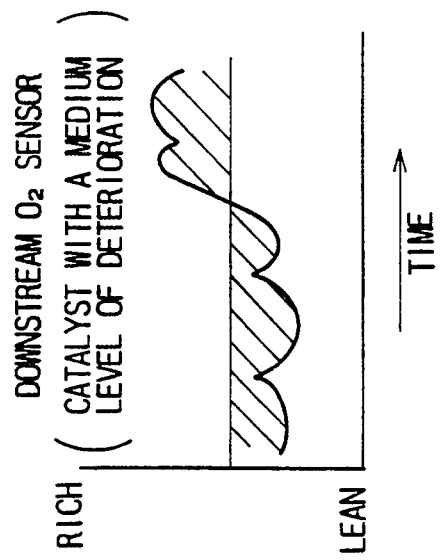
Figure 1D:
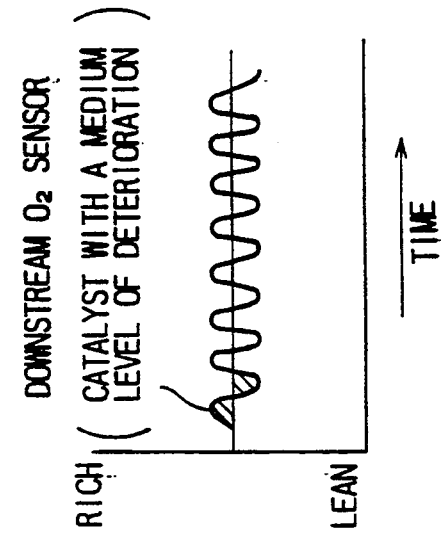
Figure 3A:
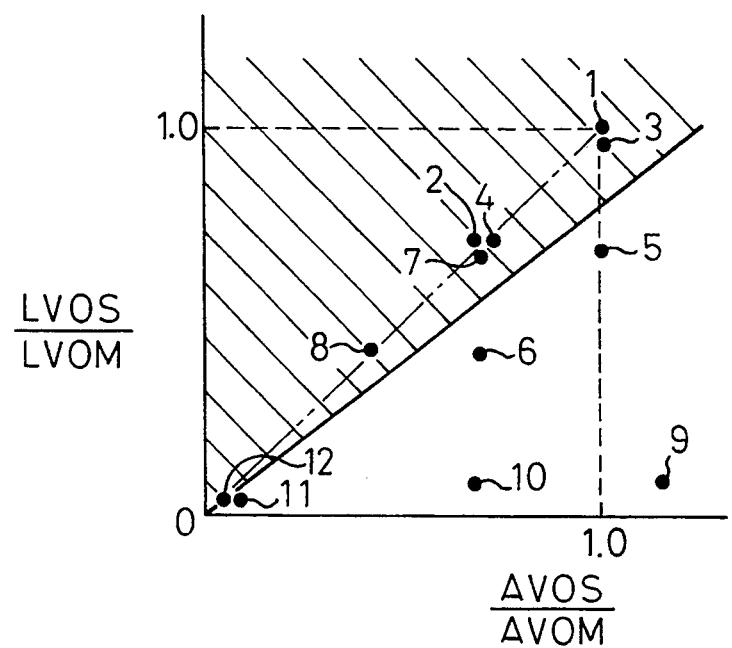
FIGS. 3A and 3B are diagrams explaining the result of the correction according to the invention.
Figure 3B:
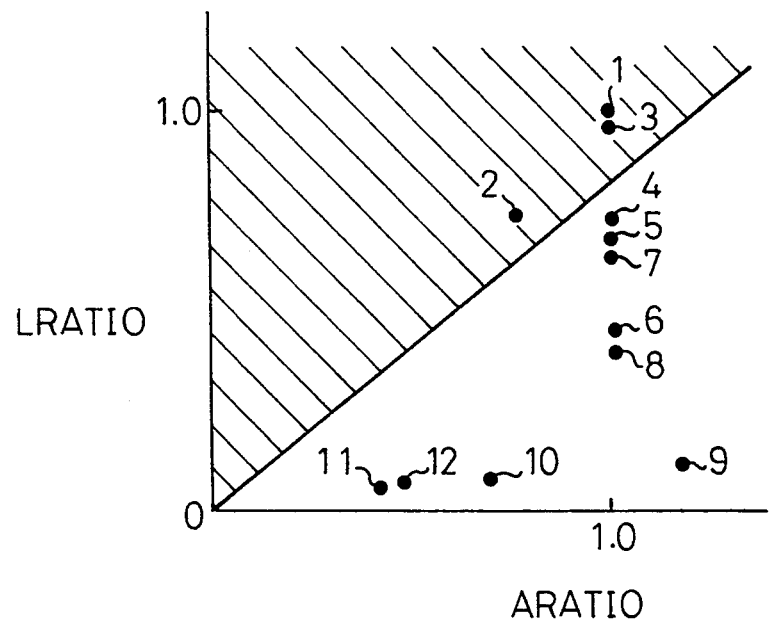

FIG. 3B shows the result of the correction by OXADJ applied to the cases No. 1 to No. 8 in FIGS. 2 and 3A. As seen from FIG. 3B, as a result of the correction, the catalysts with a high level of deterioration (cases No. 1, 2, 3) and with a medium level of deterioration (cases No. 5, 6, 7, 8) are separated distinctively by the threshold line. Therefore, it will be understood that the catalyst with a medium level of deterioration can be clearly distinguished from the catalyst with a high level of deterioration by this correction.

In FIG. 3B, it may be noted that the case No. 4, which is the combination of the catalyst with a high level of deterioration and the deteriorated downstream $O_2$ sensor, is also determined as being normal catalyst condition as a result of the correction. However, it is very rare that the high level deterioration of the catalyst and the deterioration of the downstream $O_2$ sensor occur at the same time. Therefore, from a practical stand point, such a case is not considered in this embodiment.

The cases No. 9 to No. 12 in FIGS. 3A and 3B show the result of the correction by OXADJ applied to new catalysts (i.e., catalysts which is not deteriorated).

The cases No. 9 to No. 12 represent the cases of following combinations:

| NO. | downstream $O_2$ sensor | operating condition |
| --- | --- | --- |
| 9 | normal | transient |
| 10 | deteriorated | transient |
| 11 | normal | stable |
| 12 | deteriorated | stable |

It will be understood from FIGS. 3A and 3B that the detection of the deterioration is not affected by the correction when the catalyst is new.

In FIG. 11B, after correcting the ratio of areas AVOS/AVOM by OXADJ at step 1109, it is determined whether or not the catalyst has deteriorated using LRATIO and ARATIO (corrected value of the ratio of the areas) at steps 1110 and 1111. In this embodiment, deterioration of the catalyst is detected in accordance with a map shown in FIG. 13, in which the threshold is composed of two lines (i.e., a horizontal line representing LRATIO=$L_1$, and a slanted line representing LRATIO=ARATIO x $A_1$), and the catalyst is determined as being deteriorated when the values of LRATIO and ARATIO fall in hatched portion above threshold in FIG. 13.

At step 1110, it is determined whether or not the value of LRATIO falls in the portion below the horizontal line in FIG. 13. If LRATIO is smaller than $L_1$, i.e., if the value of LRATIO falls in the portion below the horizontal line in FIG. 13, it is determined that the catalyst is in a normal condition regardless of the value of ARATIO. As explained before, when the catalyst is in normal condition, LRATIO becomes small regardless of both the operating condition of the engine and the deterioration of the downstream $O_2$ sensor (refer to FIG. 22). Therefore, when the value of LRATIO is low (i.e., less than $L_1$), it can be considered that the catalyst is in normal condition. $L_1$ is a constant determined previously in accordance with types and the sizes of the catalytic converter, and in this embodiment, $L_1$ is set at 0.7.

If LRATIO is larger than or equal to $L_1$, then at step 1111, it is determined whether or not the values of LRATIO and ARATIO fall in the portion below the slant line in FIG. 13. Where, $A_1$ represents the inclination of the slant line. In this embodiment, since the correction factor OXADJ is determined in such manner that the ratio AVOS/AVOM during the transient operating condition is selected a basis of the correction, the ratio AVOS/AVOM of the catalyst with a high level of deterioration during the transient operating condition (such as cases No. 1 and No. 2 in FIGS. 3A and 3B) is not corrected (i.e., OXADJ=1.0). Therefore, in this embodiment, $A_1$ is set at smaller value than 1.0 (for example, $A_1$=0.8), to eliminate the possibility that the catalyst with a high level of deterioration is incorrectly determined as being normal during transient operating condition (cases No. 1 and 2 in FIG. 3B).

If it is determined, at steps 1110 and 1111, that the catalyst has deteriorated, an alarm flag ALM is set (=1) at step 1312 to activate alarm 19 in FIG. 4. If it is determined that the catalyst is in normal condition both at steps 1110 and 1111, the alarm flag ALM is reset(=0) at step 1113 to deactivate alarm. The routine proceeds then, to step 1114 which stores the value of the alarm flag ALM in the back-up RAM 106 to prepare for future maintenance, and to step 1115 which clears all the parameters used in the routine.

In the above embodiment, the deterioration of the catalyst is determined by two steps (steps 1110 and 1111). However, it is also possible to store the map in FIG. 13 in the ROM 104 as a form of numerical table of LRATIO and ARATIO and to determine whether the catalyst has deteriorated directly from such numerical table.

Figure 13:
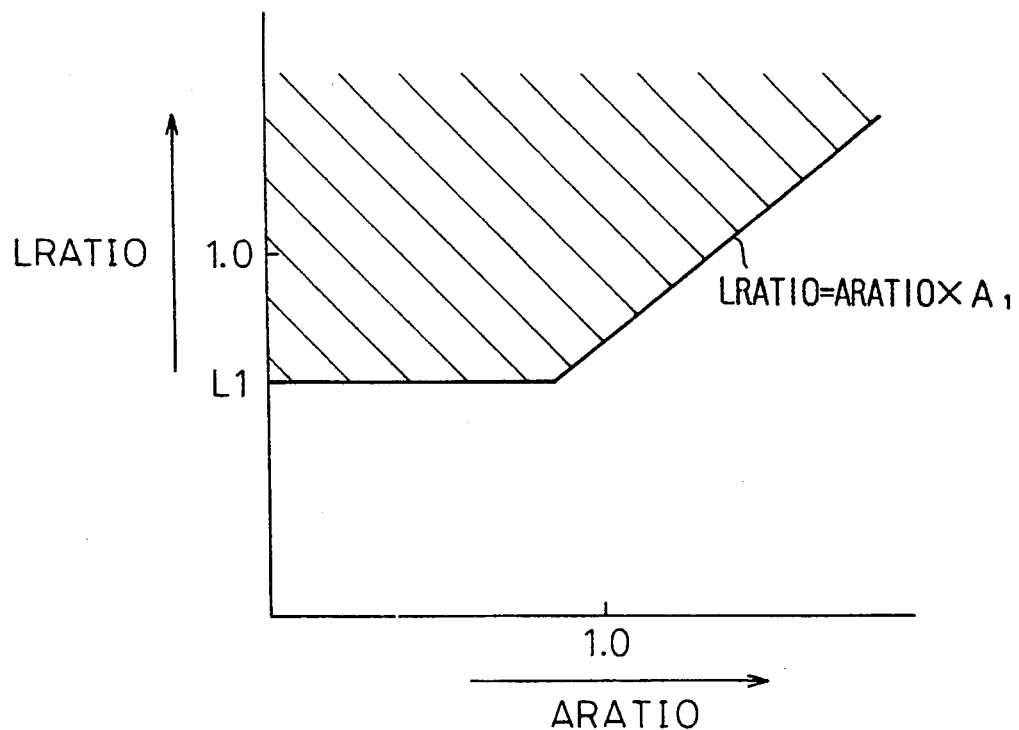
FIG. 13 is an example of the map used for detecting deterioration of the catalytic converter in the embodiment of FIGS. 11A and 11B.

Also, the inclination $A_1$ of the slant line in FIG. 13 is set at less than 1.0. However, if the ratio AVOS/AVOM in the normal operating condition is selected as a basis of the correction, $A_1$ is set at larger value than 1.0. In this case, the value of OXADJ is determined in such manner that OXADJ takes the maximum value of 1.0 when LRATIO is small regardless of operating condition, and becomes smaller as the degree of transition of the operating condition, i.e., CKATO decreases (in the opposite manner as those in FIG. 12), but also in this case, OXADJ becomes smaller as LRATIO increases when the operating condition approaches transient condition (in the same manner as those in FIG. 12). By determining OXADJ in such manner, the ratio of the area AVOS/AVOM is corrected so that AVOS/AVOM of the catalyst with a high level of deterioration decreases both in the stable condition and in the transient condition, to thereby eliminate the possibility that the catalyst with a high level of deterioration (such as cases No. 1 to No. 3) is incorrectly determined as being normal by the threshold line of $A_1 > 1.0$.

In the above embodiment, the number of reversals COX of the output signal of the downstream $O_2$ sensor is used as the parameter representing the degree of transition of the operating condition of the engine. However, it is possible to represent the degree of transition of the operating condition by other parameters than COX.

Figure 14:
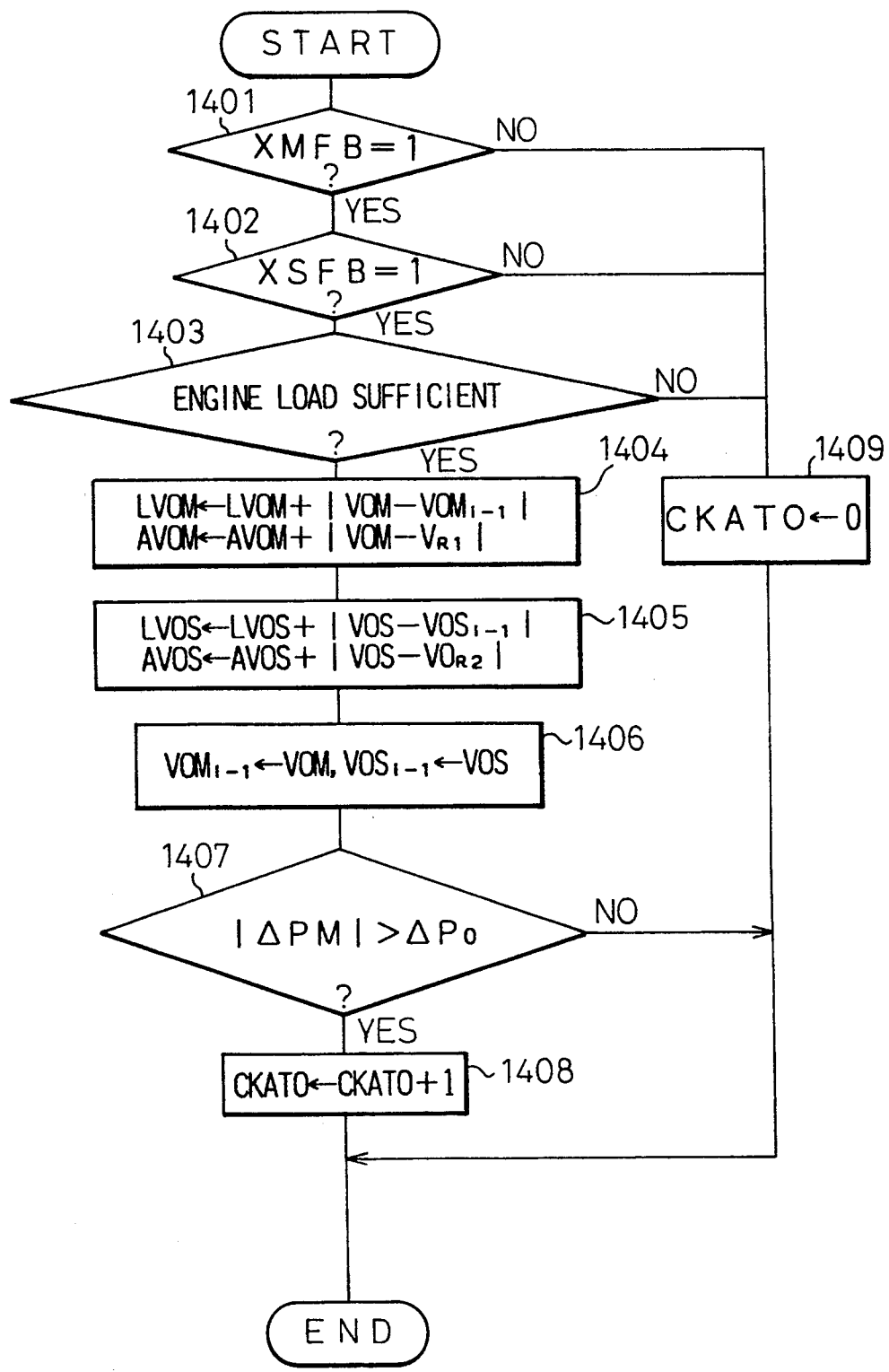
FIGS. 14 and 15A, 15B are flowcharts showing another embodiment of the routines for detecting deterioration of the catalytic converter.
Figure 15A:
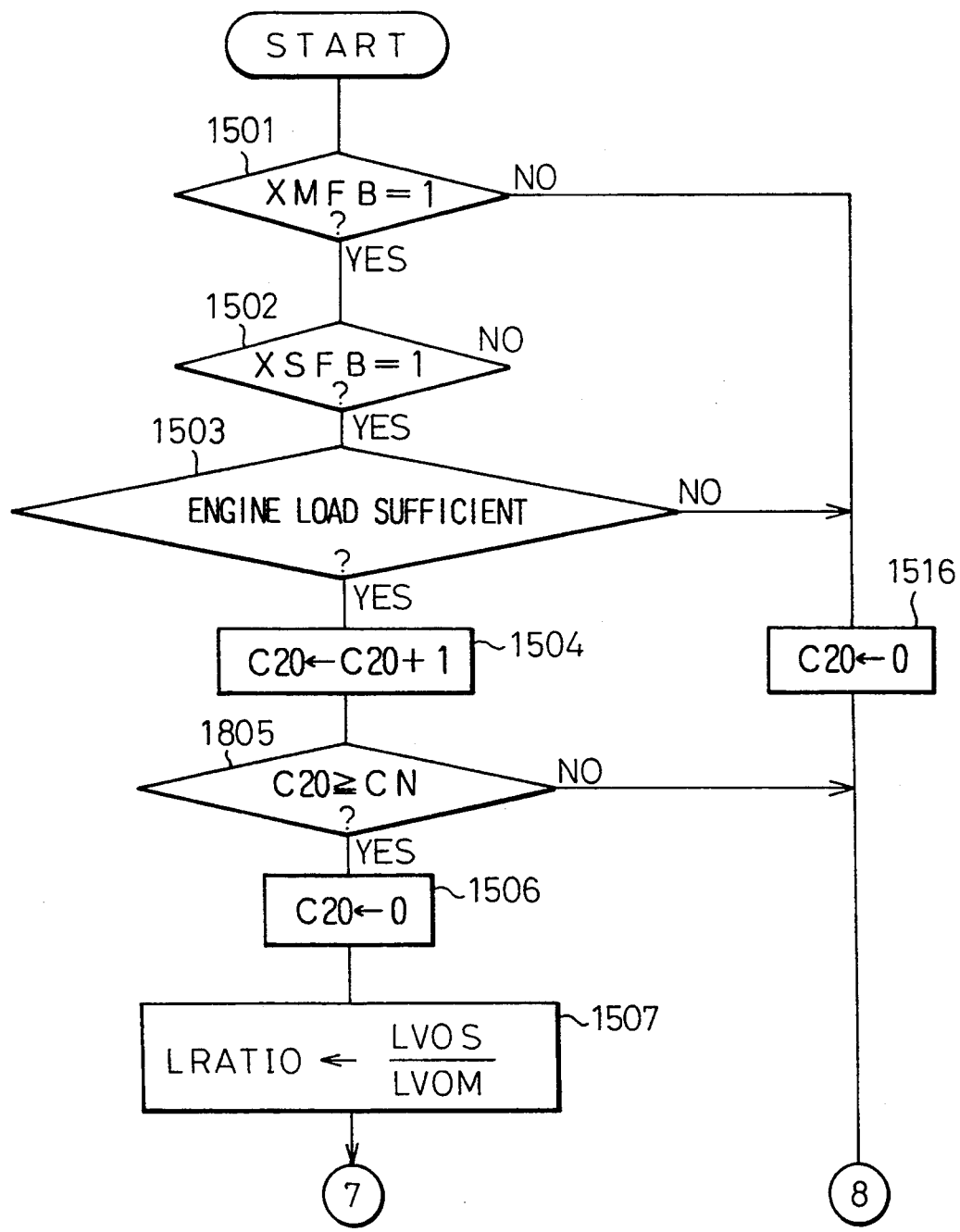
Figure 15B:
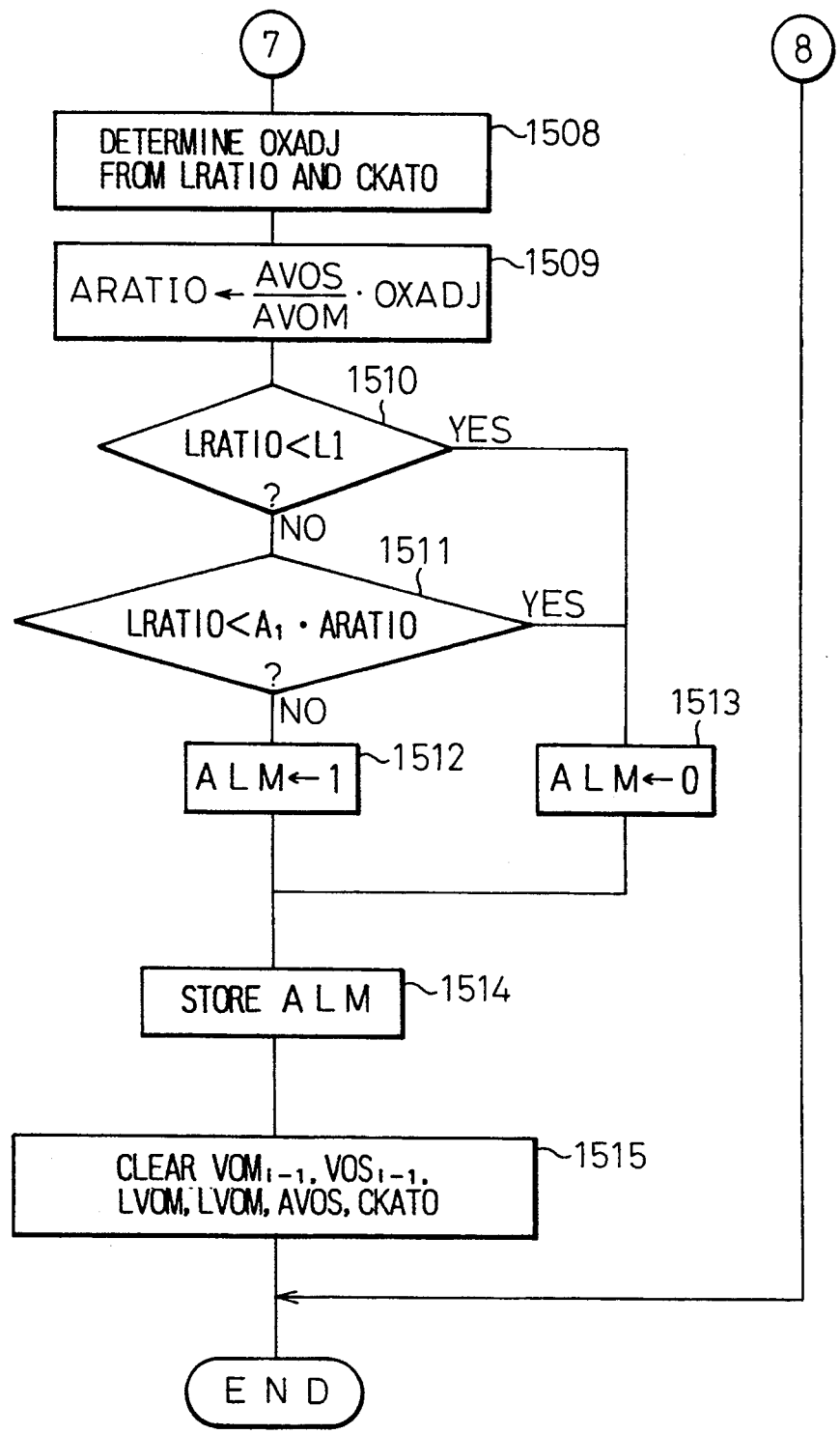

FIGS. 14 to 15B show another embodiment of the detecting operation of deterioration of the catalyst using a intake manifold pressure as a parameter representing the degree of transition of the operating condition. If a condition in which the intake manifold pressure changes at a large rate continues longer, i.e., if the degree of the change in the intake manifold pressure is large, it means that the operating condition changes considerably, and the degree of transition of the operating condition is large. Therefore, in this embodiment, a parameter CKATO which corresponds to the degree of the change in the intake manifold pressure is used to represent the degree of transition of the operating condition.

The routines in FIGS. 14 to 15B are executed by the control circuit 10 in lieu of the routines FIGS. 10 to 11B. In FIG. 14, at steps 1401 to 1403, it is determined whether or not the conditions for carrying out the detecting operation of deterioration of the catalyst are satisfied, and if satisfied, LVOM, AVOM and LVOS, AVOS are calculated at steps 1404 to 1406. Since these steps are exactly the same as steps 1001 to 1006 in FIG. 10, a detailed explanation is not repeated.

Then, at step 1407, it is determined whether the absolute value of the amount of the change in the intake manifold pressure $|\Delta PM|$ is larger than a predetermined value $\Delta P_0$. Where, $\Delta PM$ is the rate of the change in the intake manifold pressure PM and calculated as a difference between the current value of PM and the value of PM when the routine was last executed.

If $|\Delta PM|$ is larger than $\Delta P_0$, the counter CKATO is increased by 1 at step 1408. Thus, by step 1408, the value of the counter CKATO represents the number of occurrences in which the rate of change of the pressure in the intake manifold of the engine $|\Delta PM|$ exceeds a predetermined rate $\Delta P_0$ over a predetermined time period, i.e., degree of the change in the intake manifold pressure.

In FIGS. 15A and 15B, the detection of deterioration of the catalyst is carried out based on the lengths LVOM, LVOS, areas AVOM, AVOS, and CKATO. Steps in FIGS. 15A and 15B are the same as those in FIGS. 11A and 11B, except that in FIG. 15B, the value of the correction factor OXADJ is determined in accordance with LRATIO and CKATO.

Figure 16:
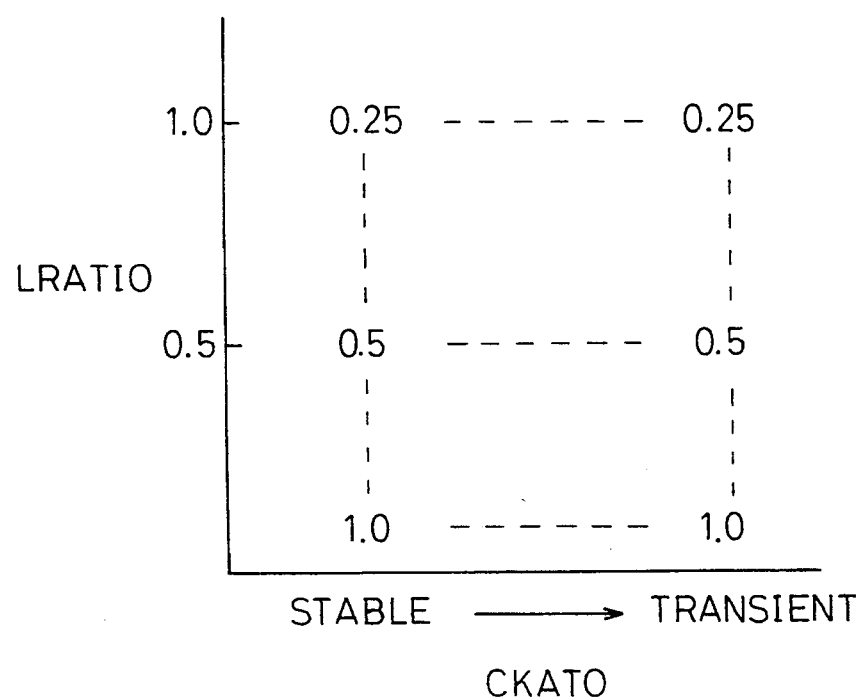
FIG. 16 shows an example of the values of the correction factor used in FIGS. 15A and 15B.
Figure 17:
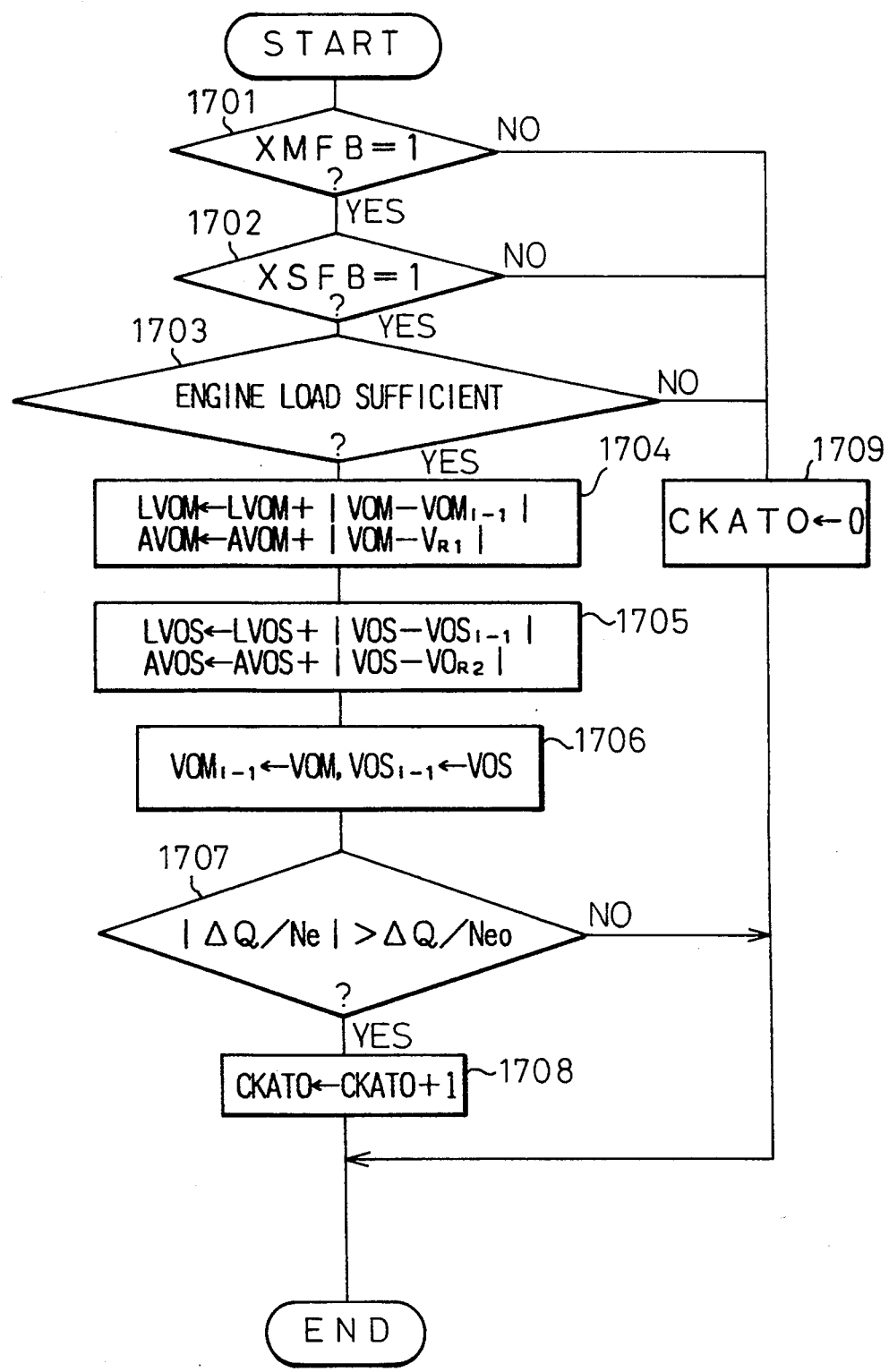
Figure 18:
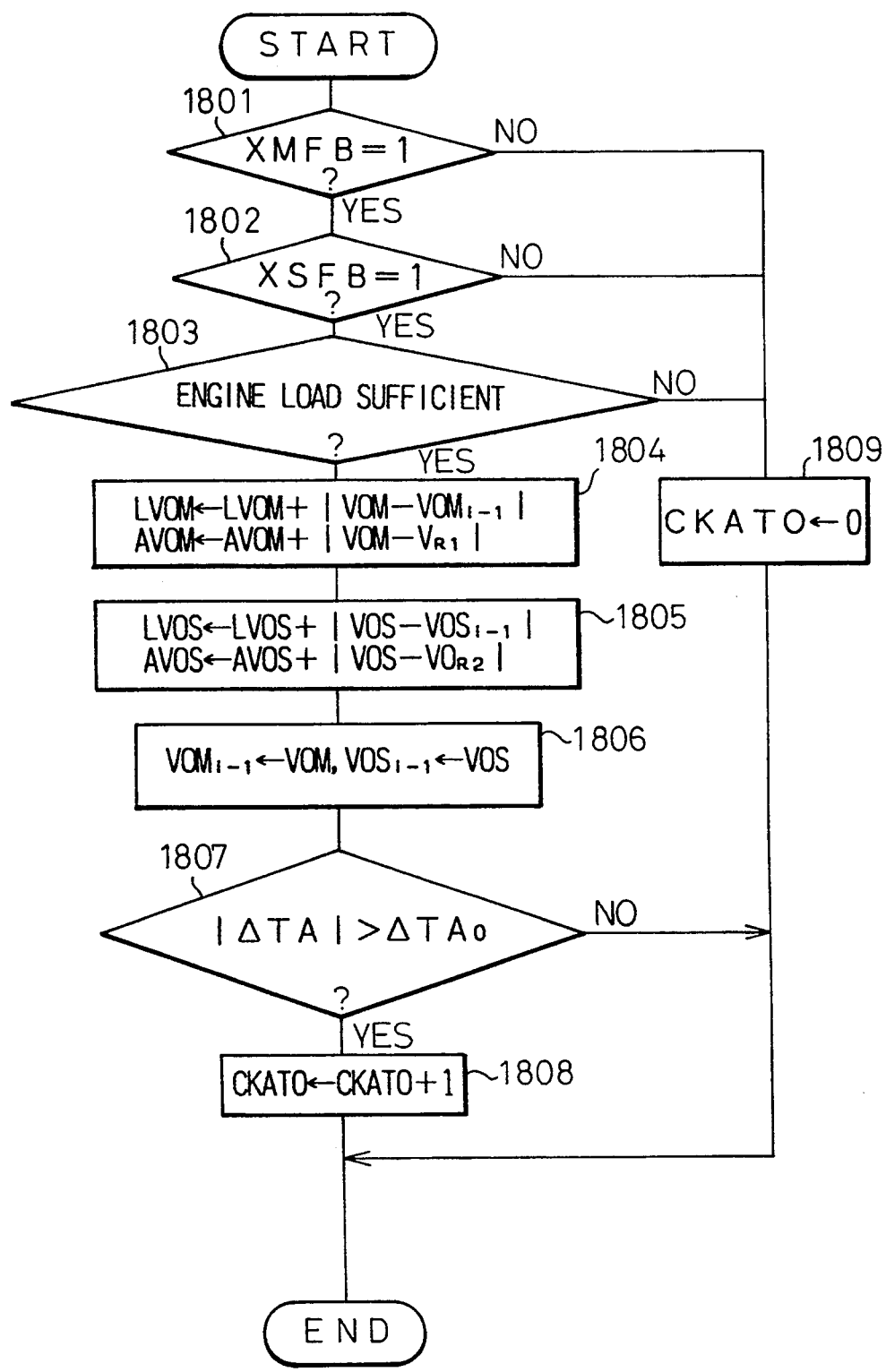
Figure 19:
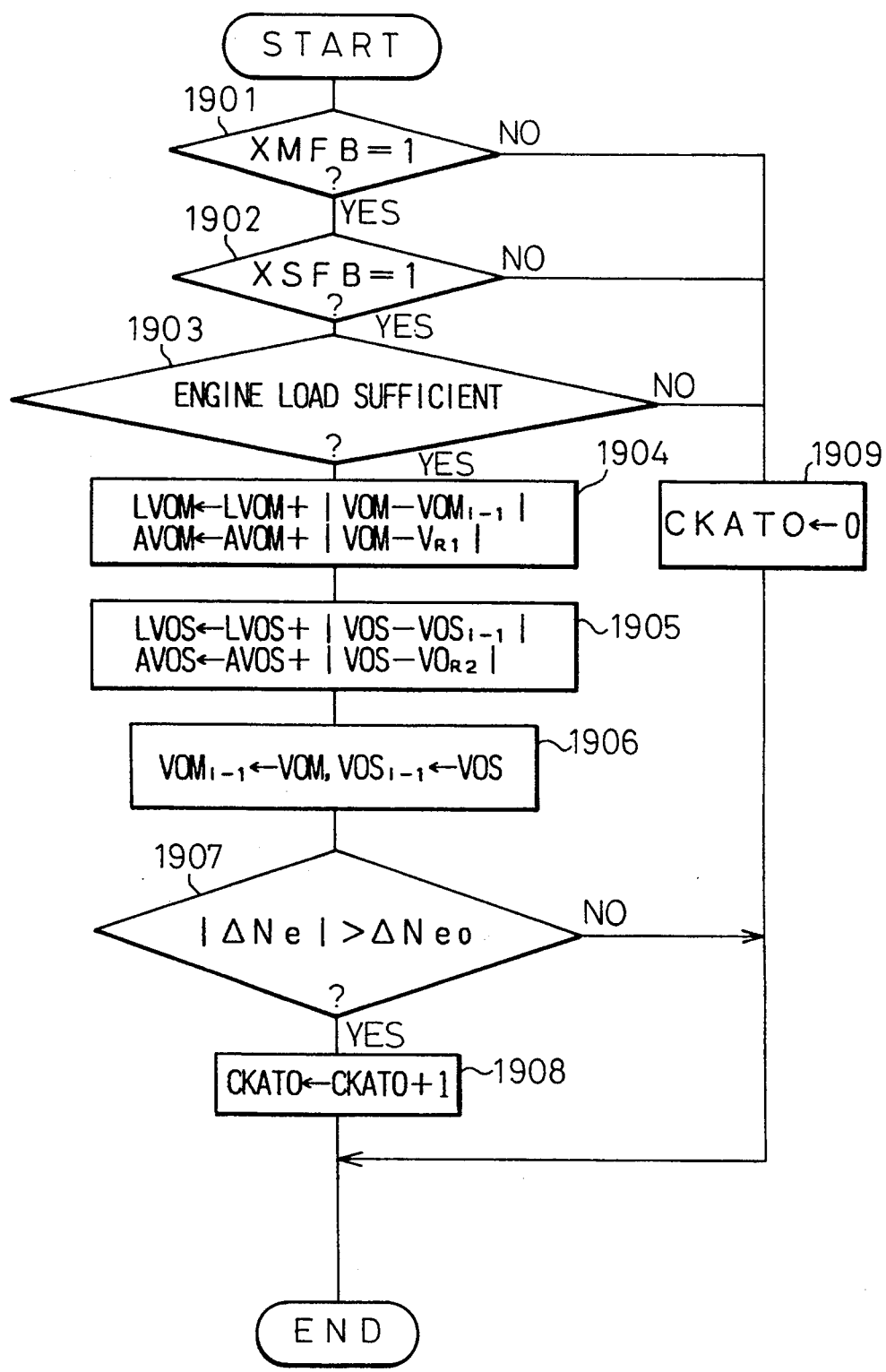

In this embodiment, the value of CKATO becomes larger as the degree of transition of the operating condition of the engine increases. Therefore, the value of OXADJ is determined in such manner that OXADJ become smaller as CKATO increases. FIG. 16 show an example of the values of OXADJ used in this embodiment which correspond to FIG. 12. Also in this embodiment, detection of the deterioration of the catalyst is carried out at steps 1510 and 1511 in accordance with the map shown in FIG. 13, using both ARATIO corrected by OXADJ, determined at step 1508, and LRATIO.

Though the degree of the change in the intake manifold pressure is used to represent the degree of change of the operating condition of the engine in the embodiment in FIG. 14, other parameters corresponding the change in the operating condition are equally used to represent the degree of transition of operating condition.

For example, a degree of the change in the intake air flow per one revolution of the engine, a degree of the change in the degree of the throttle valve opening, a degree of the change in the engine speed, or a degree of the change in the travelling speed of the vehicle can be used to represent the degree of transition of the operating condition of the engine.

FIGS. 17 to 20 are flowcharts similar to FIG. 14 showing the examples of the routine for calculating CKATO based on the parameters shown above. In FIGS. 17 to 20, $Q/N_e$, TA, $N_e$ and SPD mean the amount of intake airflow per one revolution of the engine, the degree of opening of the throttle valve, engine speed and travelling speed of the vehicle, respectively, and $\Delta$ means the difference between current values of these parameters and the values of these parameter when the routine was last executed By the routines in FIGS. 17 to 20, the value of CKATO represents the degree of change in these parameters, and the correction factor OXADJ can be determined from FIG. 16 based on CKATO in the same manner as in FIG. 15B.

Figure 21A:
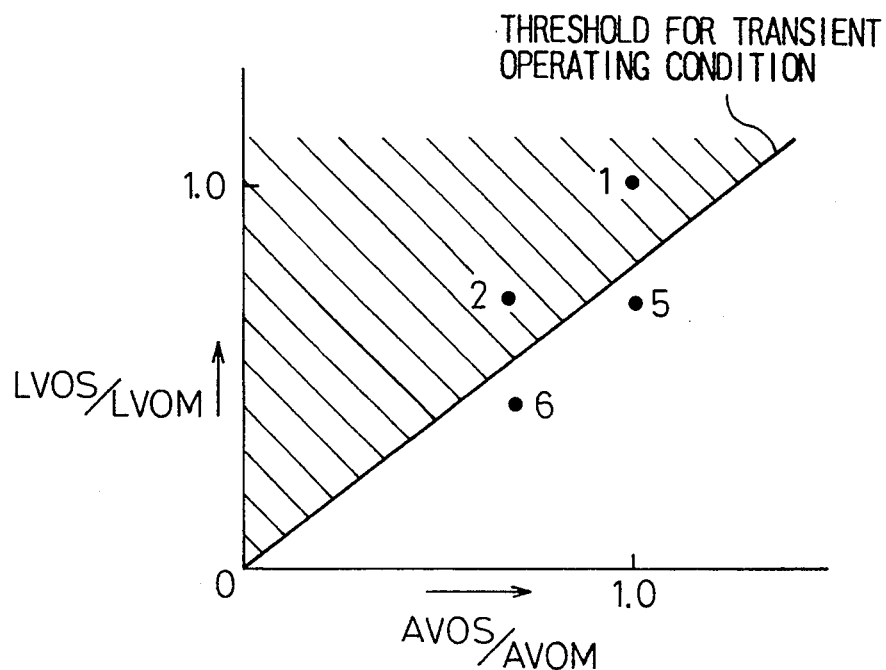
FIGS. 21A and 21B are an example of the different maps used for detecting deterioration of the catalytic converter in the embodiment of FIGS. 11A and 11B.
Figure 21B:
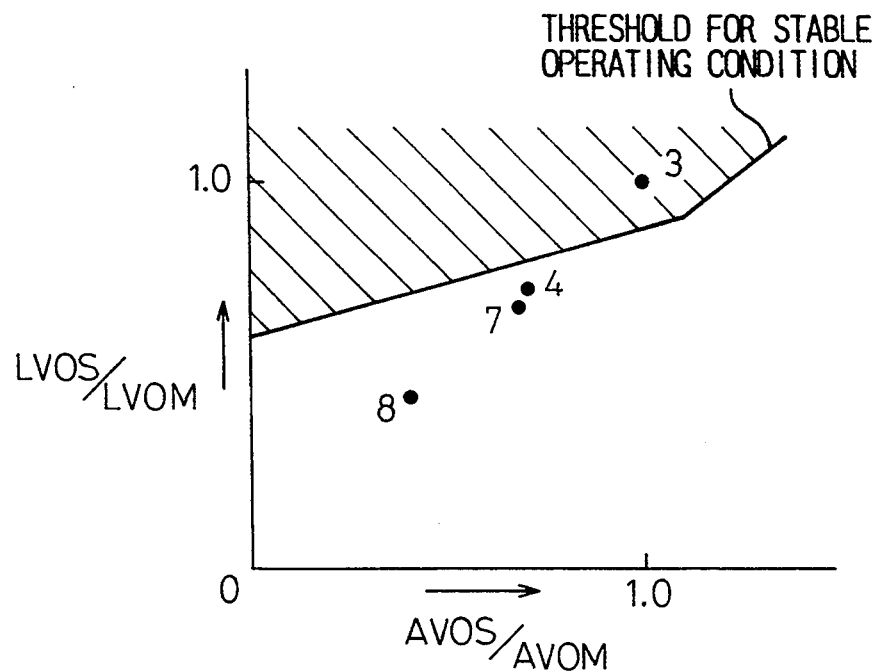
Figure 24:
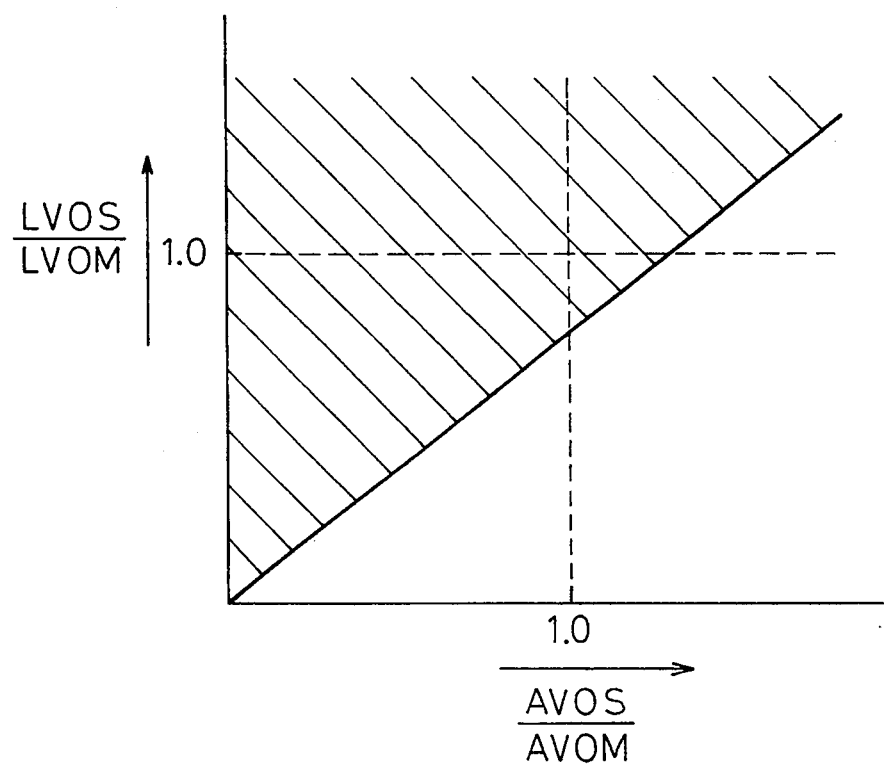
FIG. 24 is an example of the map used for detecting deterioration of the catalytic converter in the related art.

In the embodiments explained above, the ratio of the areas AVOS/AVOM is corrected in accordance with the degree of change of the operating condition of the engine. However, it is also possible to use different maps for determining deterioration of the catalyst in accordance with the degree of transition of the operating condition, instead of correcting the ratio AVOS/AVOM. FIGS. 21A and 21B show an example of the pair of maps used for this purpose. FIG. 21A shows a map used in transient operating condition. In this embodiment, the map is the same as the map in FIG. 3A used for the transient operating condition. On the other hand, FIG. 21B shows the map used in stable operating condition. As seen from FIG. 21B, the threshold line remains same in the region of high LVOS/LVOM ratio to detect the catalyst with a high level of deterioration (such as case No. 3), while the threshold line shifts to the upper side in the lower LVOS/LVOM ratio region to prevent the catalyst with a medium level of deterioration (such as cases No. 7 and No. 8) is being determined as deteriorated. As shown in FIGS. 21A and 21B, by using different maps in accordance with the degree of transition of the operating condition, catalysts with a medium level of deterioration can be clearly distinguished from the catalysts with a high level of deterioration regardless of the operating condition of the engine.

From above explanation, it will be understood that present invention provides a device which can distinguish a catalyst with a medium level of deterioration from a catalyst with a high level of deterioration regardless of the operating condition of the engine, and, thus is enable to detect deterioration of the catalyst accurately.

Though the present invention has been described with reference to specific embodiments selected for the purpose of illustration, it should be understood that numerous modifications could be applied by those skilled in the art without departing from the basic concept and scope of the present invention.

I claim:

1. A device for detecting deterioration of a three-way catalytic converter disposed in an exhaust passage of an internal combustion engine, said engine comprising, an upstream air-fuel ratio sensor disposed in the exhaust passage upstream of said catalytic converter for detecting an air-fuel ratio of the exhaust gas upstream of said catalytic converter, a downstream air-fuel ratio sensor disposed in the exhaust passage downstream of said catalytic converter for detecting the air-fuel ratio of the exhaust gas downstream of said catalytic converter, and a feedback control means for controlling the air-fuel ratio of the engine by a feedback control based on, at least, the output of said upstream air-fuel ratio sensor, said device comprising:
 a means for calculating the ratio of the length of the output signal response curve of said downstream air-fuel ratio sensor and the length of the output signal response curve of the output signal response curve of said upstream air-fuel ratio sensor, when the engine is controlled by said feedback control means;
 a means for calculating the ratio of the area bounded by the output signal response curve of said downstream air-fuel ratio sensor and a reference line thereof and the area bounded by the output signal response curve of said upstream air-fuel ratio sensor and a reference line thereof, when the engine is controlled by said feedback control means;
 a transition determining means for determining the degree of transition of the operating condition of the engine; and,
 a deterioration detecting means for detecting deterioration of said catalytic converter based on said ratio of the lengths, said ratio of the areas and said degree of transition of the operating condition of the engine.

2. A device according to claim 1, wherein said deterioration detecting means comprises a correction means for correcting the value of said ratio of areas of the output signal response curves in accordance with said degree of transition of the operating condition of the engine, and a determining means for determining that said catalytic converter has deteriorated when the relationship between said ratio of the lengths of the output response curves and said corrected value of the ratio of the areas satisfies predetermined conditions.

3. A device according to claim 2, wherein said correction means corrects the value of said ratio of the areas by multiplying a correction factor and said ratio of the areas, and said correction factor is selected so that it takes larger value as said degree of the transition of the operating condition of the engine decreases.

4. A device according to claim 3, wherein said transition determining means comprises a means for detecting the number of reversals between a rich air-fuel ratio side and a lean air-fuel ratio side of the output signal of said upstream air-fuel ratio sensor over a predetermined time period when the engine is controlled by said feedback control means, and determines the degree of transition in such a manner that the degree of transition becomes larger as said number of reversals decreases.

5. A device according to claim 3, wherein said transition determining means comprises a means for detecting that the number of occurrences of the rate of change of the pressure in the intake manifold of the engine exceeds a predetermined rate over a predetermined time period when the engine is controlled by said feedback control means, and determines the degree of transition in such a manner that the degree of transition becomes larger as said number of occurrences increases.

6. A device according to claim 3, wherein said transition determining means comprises a means for detecting that the number of occurrences of the rate of change of the intake air flow of the engine exceeds a predetermined rate over a predetermined time period when the engine is controlled by said feedback control means, and determines the degree of transition in such a manner that the degree of transition becomes larger as said number of occurrences increases.

7. A device according to claim 3, wherein said transition determining means comprises a means for detecting that the number of occurrences of the rate of change of the degree of opening of the throttle valve of the engine exceeds a predetermined rate over a predetermined time period when the engine is controlled by said feedback control means, and determines the degree of transition in such a manner that the degree of transition becomes larger as said number of occurrences increases.

8. A device according to claim 3, wherein said transition determining means comprises a means for detecting that the number of occurrences of the rate of change of the speed of the engine exceeds a predetermined rate over a predetermined time period when the engine is controlled by said feedback control means, and determines the degree of transition in such a manner that the degree of transition becomes larger as said number of occurrences increases.

9. A device according to claim 3, wherein said transition determining means comprises a means for detecting that the number of occurrences of the rate of change of the travelling speed of the vehicle driven by the engine exceeds a predetermined rate over a predetermined time period when the engine is controlled by said feedback control means, and determines the degree of transition in such a manner that the degree of transition becomes larger as said number of occurrences increases.

10. A device according to claim 1, wherein said deterioration detecting means comprises a correction means for correcting the value of said ratio of areas of the output signal response curves in accordance with said degree of transition of the operating condition of the engine and said ratio of the length of the output signal response curves, and a determining means for determining that said catalytic converter has deteriorated when the relationship between said ratio of the lengths of the output response curves and said corrected value of the ratio of the areas satisfies predetermined conditions.

11. A device according to claim 10, wherein said correction means corrects the value of said ratio of the areas by multiplying a correction factor and said ratio of the areas, and said correction factor is selected so that it takes larger value as said degree of the transition of the operating condition of the engine decreases and said ratio of the lengths decreases, respectively.

12. A device according to claim 11, wherein said transition determining means comprises a means for detecting the number of reversals between a rich air-fuel ratio side and a lean air-fuel ratio side of the output signal of said upstream air-fuel ratio sensor over a predetermined time period when the engine is controlled by said feedback control means, and determines the degree of transition in such a manner that the degree of transition becomes larger as said number of reversals decreases.

13. A device according to claim 11, wherein said transition determining means comprises a means for detecting that the number of occurrences of the rate of change of the pressure in the intake manifold of the engine exceeds a predetermined rate over a predetermined time period when the engine is controlled by said feedback control means, and determines the degree of transition in such a manner that the degree of transition becomes larger as said number of occurrences increases.

14. A device according to claim 11, wherein said transition determining means comprises a means for detecting that the number of occurrences of the rate of change of the intake air flow of the engine exceeds a predetermined rate over a predetermined time period when the engine is controlled by said feedback control means, and determines the degree of transition in such a manner that the degree of transition becomes larger as said number of occurrences increases.

15. A device according to claim 11, wherein said transition determining means comprises a means for detecting that the number of occurrences of the rate of change of the degree of opening of the throttle valve of the engine exceeds a predetermined rate over a predetermined time period when the engine is controlled by said feedback control means, and determines the degree of transition in such a manner that the degree of transition becomes larger as said number of occurrences increases.

16. A device according to claim 11, wherein said transition determining means comprises a means for detecting that the number of occurrences of the rate of change of the speed of the engine exceeds a predetermined rate over a predetermined time period when the engine is controlled by said feedback control means, and determines the degree of transition in such a manner that the degree of transition becomes larger as said number of occurrences increases.

17. A device according to claim 11, wherein said transition determining means comprises a means for detecting that the number of occurrences of the rate of change of the travelling speed of the vehicle driven by the engine exceeds a predetermined rate over a predetermined time period when the engine is controlled by said feedback control means, and determines the degree of transition in such a manner that the degree of transition becomes larger as said number of occurrences increases.

18. A device according to claim 1, wherein said deterioration detecting means comprises a determining means for determining that said catalytic converter has deteriorated when the relationship between said ratio of the lengths of the output response curves and said ratio of the areas of the output response curves satisfies predetermined conditions, and different conditions are selected as said predetermined conditions in accordance with said degree of transition of the operating condition of the engine.

19. A device according to claim 18, wherein said transition determining means comprises a means for detecting the number of reversals between a rich air-fuel ratio side and a lean air-fuel ratio side of the output signal of said upstream air-fuel ratio sensor over a predetermined time period when the engine is controlled by said feedback control means, and determines the degree of transition in such a manner that the degree of transition becomes larger as said number of reversals decreases.

20. A device according to claim 18, wherein said transition determining means comprises a means for detecting that the number of occurrences of the rate of change of the pressure in the intake manifold of the engine exceeds a predetermined rate over a predetermined time period when the engine is controlled by said feedback control means, and determines the degree of transition in such a manner that the degree of transition becomes larger as said number of occurrences increases.

21. A device according to claim 18, wherein said transition determining means comprises a means for detecting that the number of occurrences of the rate of change of the intake air flow of the engine exceeds a predetermined rate over a predetermined time period when the engine is controlled by said feedback control means, and determines the degree of transition in such a manner that the degree of transition becomes larger as said number of occurrences increases.

22. A device according to claim 18, wherein said transition determining means comprises a means for detecting that the number of occurrences of the rate of change of the degree of opening of the throttle valve of that the engine exceeds a predetermined rate over a predetermined time period when the engine is controlled by said feedback control means, and determines the degree of transition in such a manner that the degree of transition becomes larger as said number of occurrences increases.

23. A device according to claim 18, wherein said transition determining means comprises a means for detecting that the number of occurrences of the rate of change of the speed of the engine exceeds a predetermined rate over a predetermined time period when the engine is controlled by said feedback control means, and determines the degree of transition in such a manner that the degree of transition becomes larger as said number of occurrences increases.

24. A device according to claim 18, wherein said transition determining means comprises a means for detecting that the number of occurrences of the rate of change of the travelling speed of the vehicle driven by the engine exceeds a predetermined rate over a predetermined time period when the engine is controlled by said feedback control means, and determines the degree of transition in such a manner that the degree of transition becomes larger as said number of occurrences increases.

25. A device according to claim 1, wherein said transition determining means comprises a means for detecting the number of reversals between a rich air-fuel ratio side and a lean air-fuel ratio side of the output signal of said upstream air-fuel ratio sensor over a predetermined time period when the engine is controlled by said feedback control means, and determines the degree of transition in such a manner that the degree of transition becomes larger as said number of reversals decreases.

26. A device according to claim 1, wherein said transition determining means comprises a means for detecting that the number of occurrences of the rate of change of the pressure in the intake manifold of the engine exceeds a predetermined rate over a predetermined time period when the engine is controlled by said feedback control means, and determines the degree of transition in such a manner that the degree of transition becomes larger as said number of occurrences increases.

27. A device according to claim 1, wherein said transition determining means comprises a means for detecting that the number of occurrences of the rate of change of the intake air flow of the engine exceeds a predetermined rate over a predetermined time period when the engine is controlled by said feedback control means, and determines the degree of transition in such a manner that the degree of transition becomes larger as said number of occurrences increases.

28. A device according to claim 1, wherein said transition determining means comprises a means for detecting that the number of occurrences of the rate of change of the degree of opening of the throttle valve of the engine exceeds a predetermined rate over a predetermined time period when the engine is controlled by said feedback control means, and determines the degree of transition in such a manner that the degree of transition becomes larger as said number of occurrences increases.

29. A device according to claim 1, wherein said transition determining means comprises a means for detecting that the number of occurrences of the rate of change of the speed of the engine exceeds a predetermined rate over a predetermined time period when the engine is controlled by said feedback control means, and determines the degree of transition in such a manner that the degree of transition becomes larger as said number of occurrences increases.

30. A device according to claim 1, wherein said transition determining means comprises a means for detecting that the number of occurrences of the rate of change of the travelling speed of the vehicle driven by the engine exceeds a predetermined rate over a predetermined time period when the engine is controlled by said feedback control means, and determines the degree of transition in such a manner that the degree of transition becomes larger as said number of occurrences increases.

* * * * *